(12) United States Patent
Saito et al.

(10) Patent No.: US 7,743,236 B2
(45) Date of Patent: Jun. 22, 2010

(54) RECONFIGURABLE PROCESSOR

(75) Inventors: Miyoshi Saito, Kawasaki (JP); Hisanori Fujisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/244,062

(22) Filed: Oct. 6, 2005

(65) Prior Publication Data
US 2006/0206696 A1    Sep. 14, 2006

(30) Foreign Application Priority Data
Mar. 14, 2005   (JP) ............................. 2005-071320

(51) Int. Cl.
*G06F 9/00*   (2006.01)
(52) U.S. Cl. .......................... 712/227; 712/226; 712/15
(58) Field of Classification Search ................. 712/227, 712/226, 15
See application file for complete search history.

(56) References Cited

U.S. PATENT DOCUMENTS

| | | | |
|---|---|---|---|
| 4,509,116 A | | 4/1985 | Lackey et al. |
| 5,594,918 A | * | 1/1997 | Knowles et al. ............... 712/15 |
| 5,838,165 A | * | 11/1998 | Chatter ......................... 326/38 |
| 5,842,031 A | * | 11/1998 | Barker et al. .................. 712/23 |
| 6,487,651 B1 | * | 11/2002 | Jackson et al. ................ 712/13 |
| 6,665,795 B1 | | 12/2003 | Roth et al. |
| 6,745,318 B1 | | 6/2004 | Mansingh et al. |
| 6,954,845 B2 | * | 10/2005 | Arnold et al. ................. 712/36 |
| 7,039,737 B1 | * | 5/2006 | Dorr et al. ................... 710/240 |
| 7,126,381 B1 | * | 10/2006 | Schmit et al. ................ 326/101 |
| 7,191,321 B2 | * | 3/2007 | Bernstein et al. ............ 712/245 |
| 2001/0049816 A1 | * | 12/2001 | Rupp ........................... 716/16 |
| 2002/0029330 A1 | | 3/2002 | Kamano et al. |
| 2004/0001445 A1 | * | 1/2004 | Stansfield .................... 370/254 |
| 2004/0088527 A1 | * | 5/2004 | Huppenthal et al. ......... 712/226 |
| 2004/0103264 A1 | * | 5/2004 | Fujii et al. .................... 712/15 |
| 2004/0125103 A1 | * | 7/2004 | Kaufman et al. ............ 345/419 |

(Continued)

FOREIGN PATENT DOCUMENTS

EP          0 325 384          1/1989

(Continued)

OTHER PUBLICATIONS

Michael Taylor "The Raw Prototype Design Document"; Published: Sep. 6, 2004; Pertinent pp. 1-50.*

(Continued)

*Primary Examiner*—Eddie P Chan
*Assistant Examiner*—Idriss N Alrobaye
(74) *Attorney, Agent, or Firm*—Arent Fox LLP

(57) ABSTRACT

The present invention provides a reconfigurable processing apparatus enabling clusters to utilize a shared functional unit by using data and a validity signal received from the clusters by way of a network therebetween. In the reconfigurable processing apparatus comprising one or more clusters which are reconfigured based on configuration information, the shared functional unit accepts an input data and an input valid signal from the clusters, the input valid signal starts up the shared functional unit so as to operate the input data received with the input valid signal and output, to the cluster, an output data as the operation result and an output valid signal for notifying of the cluster as an output destination of the aforementioned output data.

10 Claims, 22 Drawing Sheets

U.S. PATENT DOCUMENTS

| | | | |
|---|---|---|---|
| 2006/0117274 A1* | 6/2006 | Tseng et al. ................... | 716/1 |
| 2006/0184766 A1* | 8/2006 | Pires Dos Reis Moreira .. | 712/15 |
| 2007/0058805 A1* | 3/2007 | Ohkuma et al. .............. | 380/37 |
| 2008/0024506 A1* | 1/2008 | Lindholm et al. ........... | 345/506 |

FOREIGN PATENT DOCUMENTS

| | | |
|---|---|---|
| EP | 0 576 749 A1 | 1/1994 |
| JP | 54-061851 | 5/1979 |
| JP | 59-16072 | 1/1984 |
| JP | 63-291155 | 11/1988 |
| JP | 02-005173 | 1/1990 |
| JP | 06-348492 | 12/1994 |
| JP | 2000-201066 A | 7/2000 |
| JP | 2001-312481 A | 11/2001 |
| JP | 2002-073331 | 3/2002 |
| JP | 2004-133781 A | 4/2004 |
| JP | 2004511042 | 4/2004 |
| WO | WO 03/036507 A2 | 5/2003 |
| WO | WO 2004/023290 | 3/2004 |
| WO | 2004/042560 A2 | 5/2004 |

OTHER PUBLICATIONS

Michael Taylor "The Raw Prototype Design Document", MIT, Nov. 1999, pp. 1-89.*

H. Ito et al; Dynamically Reconfigurable Logic LSI-PCA-1; 2001; *Symposium on VLSI Circuits Digest of Technical Papers*; Jun. 14-16, 2001; pp. 103-106: XP010551509; ISBN: 4-89114-014-3; pp. 103-105; figures 1-3, 5.

Xingcha Fan et al; Architecture Design Of A Fully Asynchronous VLSI Chip For DSP Custom Applications; *Proceedings of the International Symposium on Circuits and Systems*; San Diego, May 10-13, 1992; *Proceedings of the Intemaitonal Symposium on Circuits and Systems*; (ISCAS); New York; IEEE; US; vol. 4 Conf. 25; May 3, 1992; pp. 2112-2115; XP010061680; ISBN: 0-7803-0593-0; pp. 2113; left-hand column; figure 1.

Naohisa Takahashi et al; A Data Flow Processor Array System; Design and Analysis; *Proceeding of the Annual Symposium on Computer Architecture*; Stockholm, 1983; Proceedings of the Annual International Symposium on Computer Architecture; Los Angeles; IEEE Comp. Soc. Press, US; vol. SYMP. 10; Jun. 13, 1983; pp. 243-250; XP007900128; ISBN: 0-8186-8159-4.

Scott Hauck et al; The Chimaera Reconfigurable Functional Unit; Field-Programmable Custom Computing Machines; 1997; Proceedings; *The 5$^{th}$ Annual IEE Symposium On* Napa Valley; CA: USA; *IEEE Comput. Soc*; US; Apr. 16, 1997; pp. 87-96; XP010247471; ISBN: 0-8186-8159-4.

Gerard J.M. Smit et al; Lessons Learned From Designing The Montium A Coarse-Grained Reconfigurable Processing Tile; System-On-Chip; 2004; Proceedings. *2004 International Symposium on* Tampere; Finland; Nov. 16-18, 2004; Piscataway; NJ; USA; IEEE; Nov. 16, 2004; pp. 29-32; XP010779386; ISBN: 0-7803-8558-6; p. 30; left-hand column, paragraph 3; figure 1.

John Teifel et al; An Asynchronous Dataflow FPGA Architecture; *IEEE Transactions on Computers*; vol. 53; No. 11; Nov. 2004; pp. 1376-1392; XP002379722; ISSN: 0018-9340.

English Translation of European Official Communication dated Dec. 18, 2007.

Japanese Office Action dated Mar. 24, 2009, 5 pages.

Koichiro Furuta et al. (NEC Corporation); "A Dynamically Reconfigurable Logic LSI with Flexible Reconfiguration Control Mechanism"; Technical Report of IEICE; ED99-55; SMD99-29; ICD99-37; pp. 1~8, The Institute of Electronics, Information and Communication Engineers.

* cited by examiner

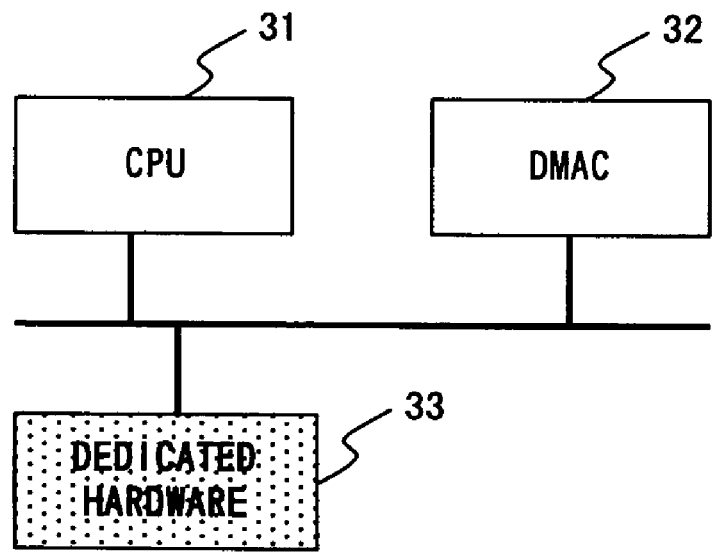
F I G. 3

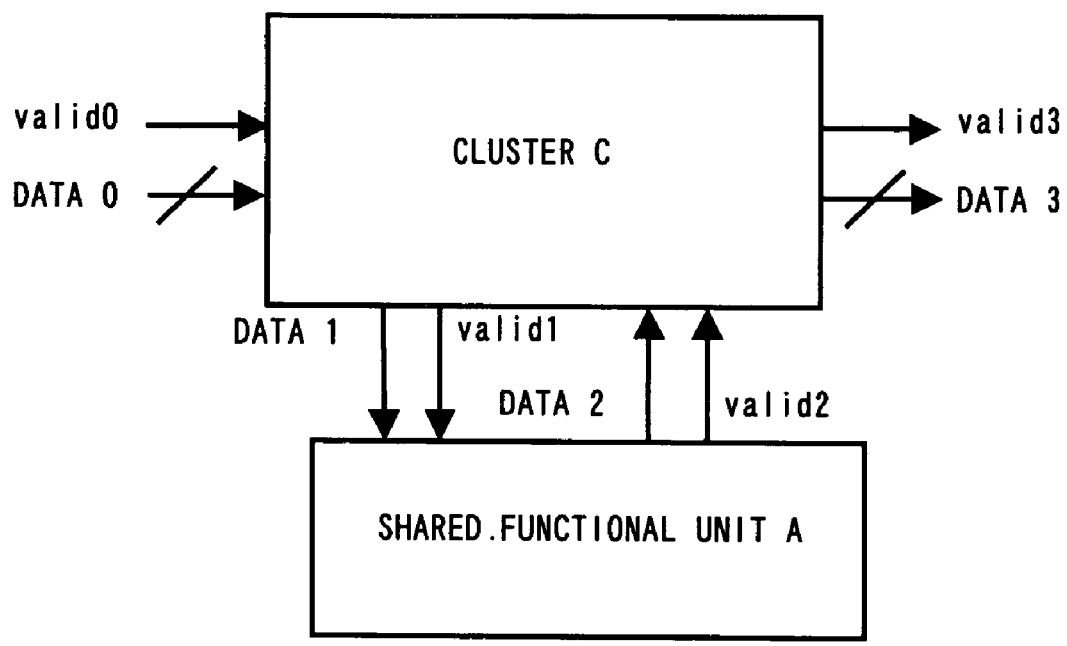
F I G. 7

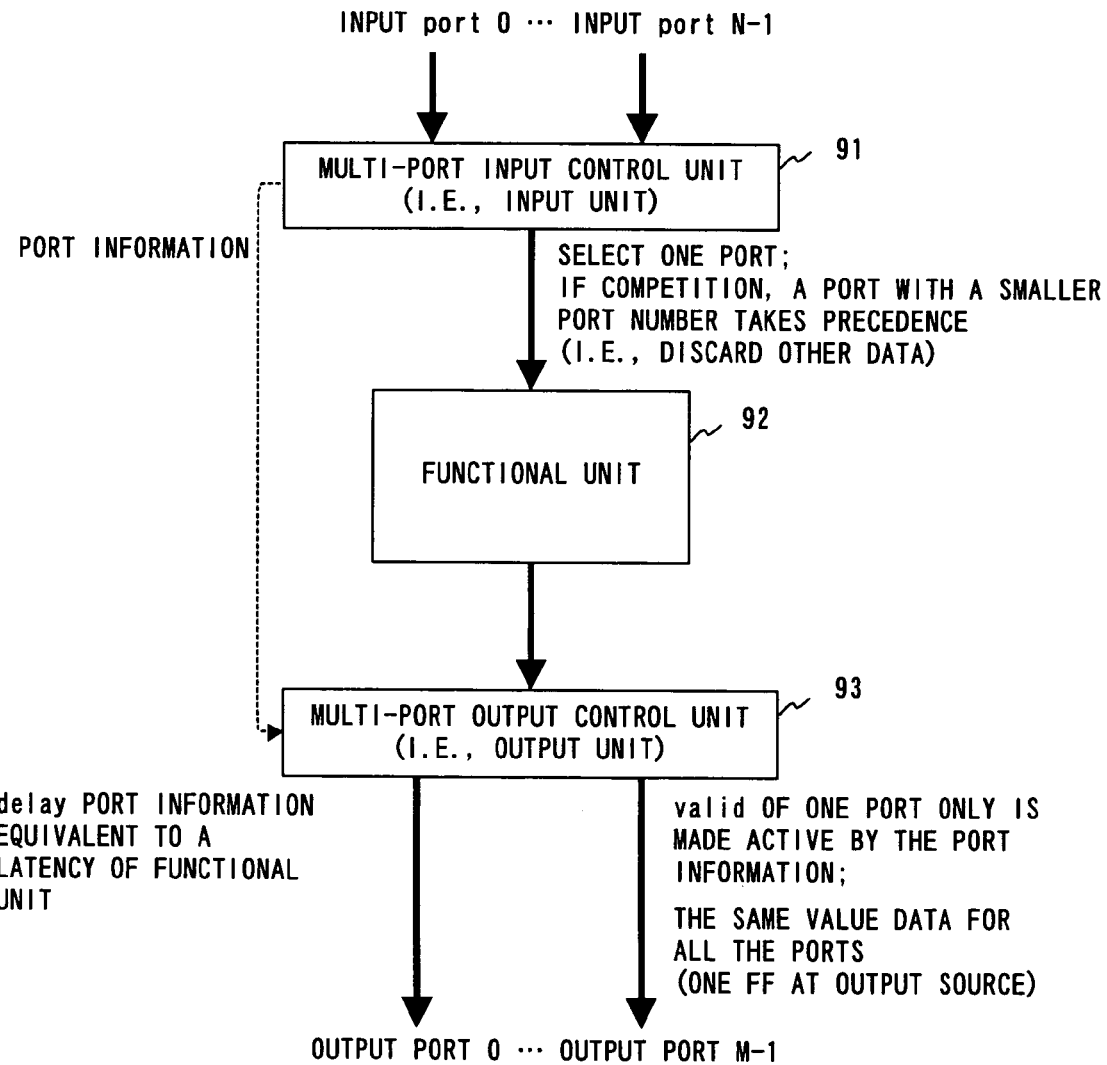
F I G. 9

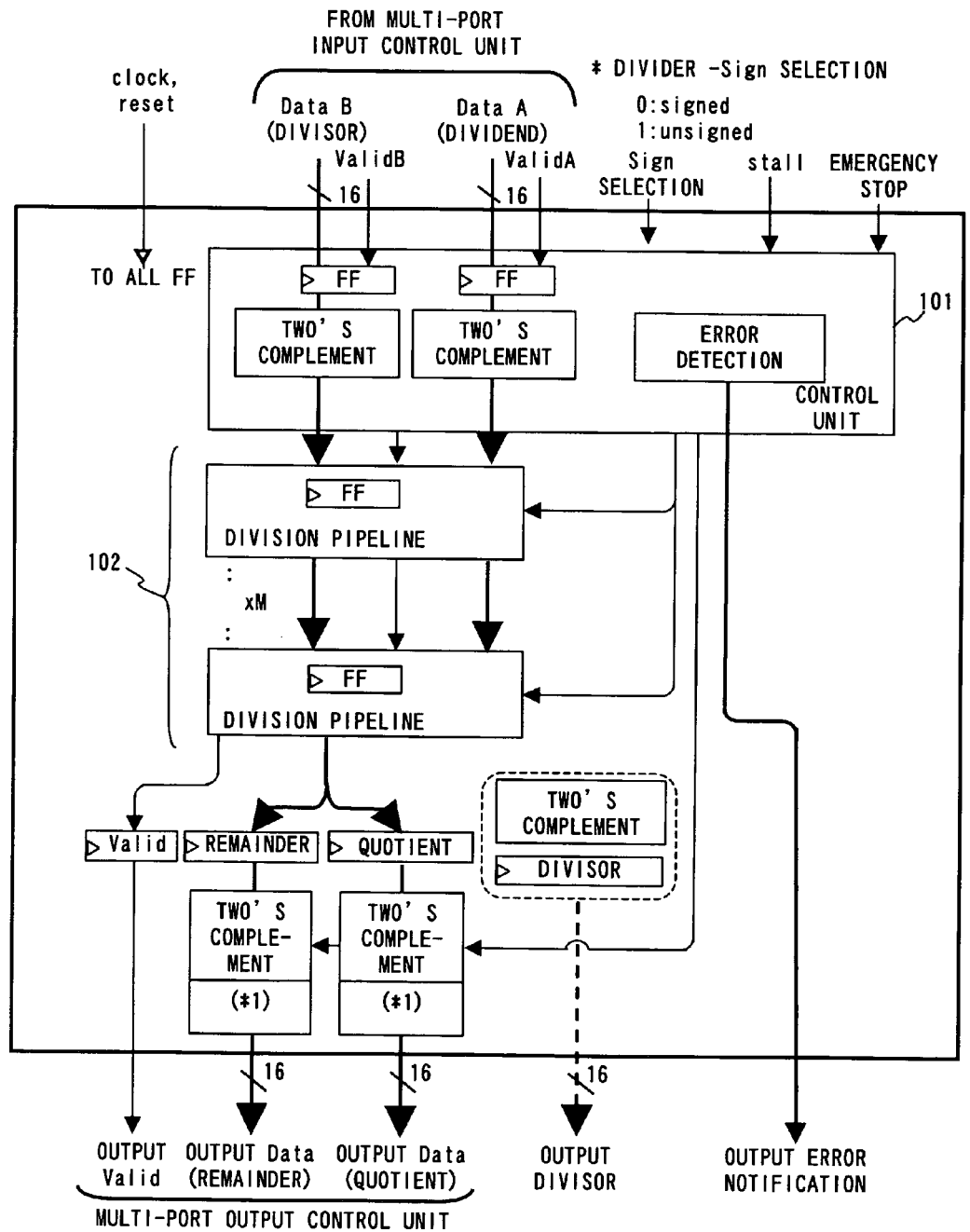
F I G. 1 3

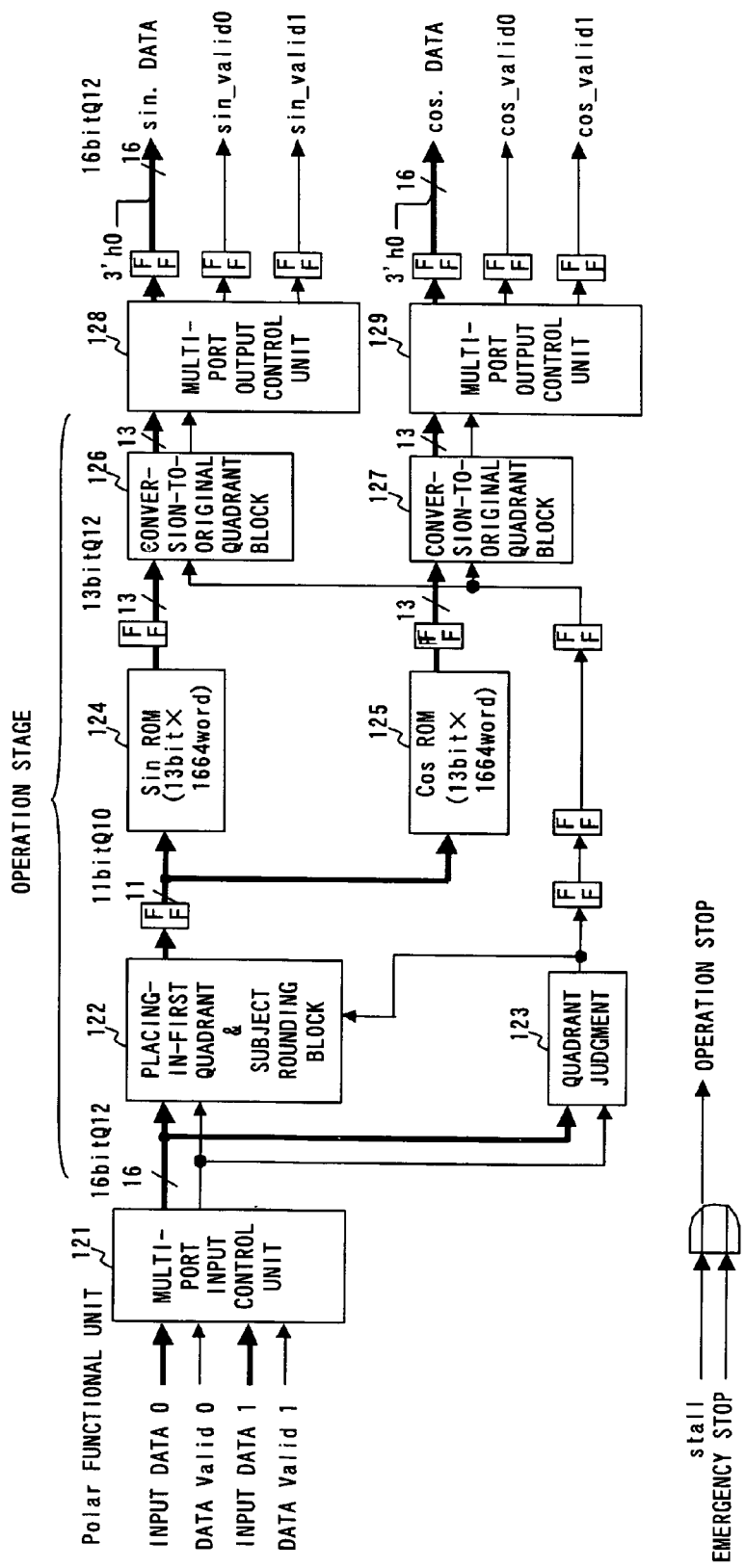
F I G. 14

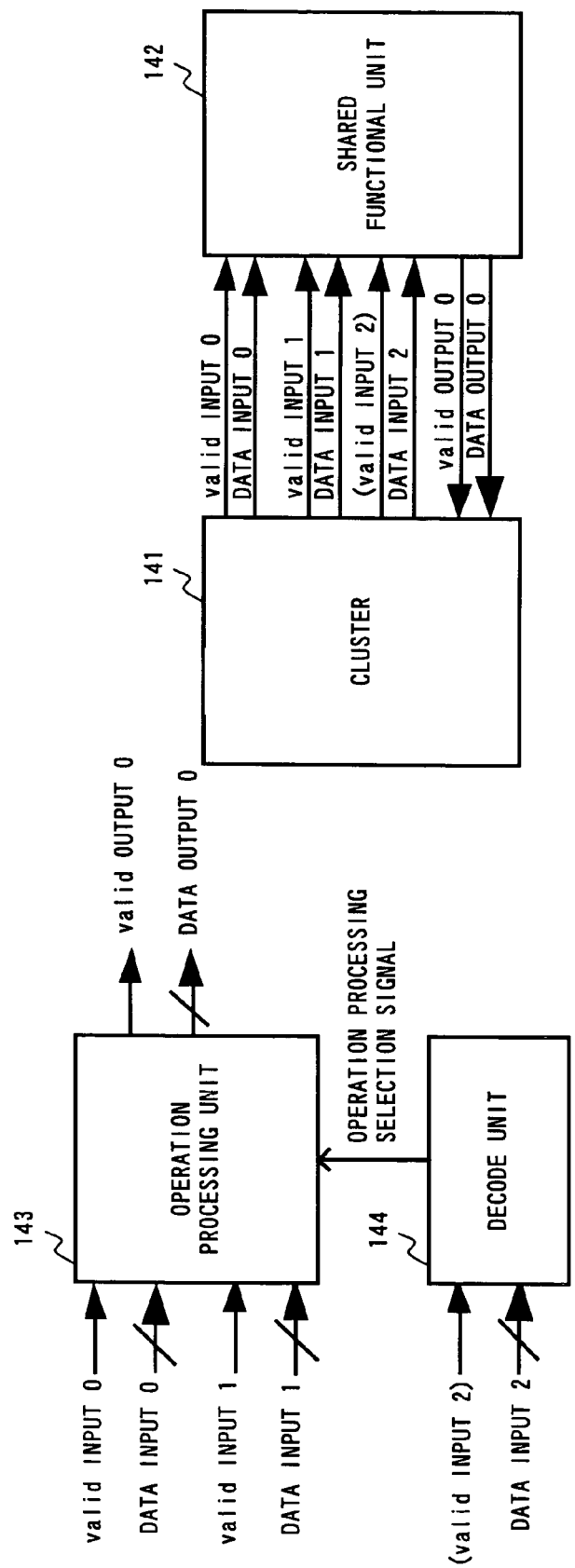
F I G. 17

| OPERATION PROCESSING CODE | PROCESSING CONTENT |
|---|---|
| 000 | No Operation |
| 001 | Reserved |
| 010 | DIVISION WITHOUT A SIGN |
| 011 | DIVISION WITH A SIGN |
| 100 | SQUARE ROOT EXTRACTION |

F I G. 1 8

RECONFIGURABLE PROCESSOR

CROSS-REFERENCE TO RELATED APPLICATIONS

This application is based upon and claims the benefit of priority from the prior Japanese Patent Application No. 2005-071320 filed on Mar. 14, 2005, the entire contents of which are incorporated herein by reference.

BACKGROUND OF THE INVENTION

1. Field of the Invention

The present invention relates to an ALU (arithmetic and logic unit) array comprising a plurality of ALUs, et cetera, and a technique for setting an instruction for an ALU and control for interconnecting ALUs with the ALU array by configuration information; and in particular to a comprisal of a functional unit being shared among reconfigurable arithmetic circuits for an arithmetic unit having a plurality of reconfigurable arithmetic circuits (i.e., clusters) which switch, et cetera, the configuration information by using a sequencer.

2. Description of the Related Art

Today, proposals have been presented to improve processing speed and make a processor compact by carrying out operation processing by arraying a plurality of reconfigurable arithmetic circuits (simply called a "cluster" hereinafter) in a reconfigurable processor having a cluster.

FIG. 1 exemplifies an arithmetic unit, in which each cluster 1 is connected by a crossbar connection 12 for instance, thereby enabling data transmission among the clusters.

A single cluster 1 has an ALU array unit which is equipped with a plurality of operation units. The operation unit is usually comprises of an ALU, a multiplier or the like.

The cluster is comprised, for example, as shown by FIG. 2 (N.B.: FIG. 2 is an illustrative block diagram conceptually showing a comprisal of a cluster within a conventional reconfigurable processor).

The cluster 1 comprises a operation unit group 2 (i.e., ALU array unit), configuration memory 3 and a sequencer 4.

The operation unit group 2 comprises a data input unit 5, a data buffer unit 6, a data buffer control unit 7, an inter-operation unit network 8, data memory 9 and operation units 10.

The data input unit 5 supplies the data memory 9 and operation units 10 by way of the inter-operation unit network 8 with input data which is input from the outside. For example, the data input unit 5, comprising a data buffer unit 6 as an example configuration, so that the data buffer unit 6 selects either buffering, or not buffering, input data input from the outside based on a control signal from the data buffer control unit 7. The data buffer control unit 7 receives configuration information from the configuration memory 3, sends a control signal to the data buffer unit 6 as the aforementioned control signal according to the configuration information and selects either buffering or not buffering input data.

The inter-operation unit network 8 is interconnected with various components (e.g., data input unit 5, data memory 9 and operation units 10). The inter-operation unit network 8 enables data transmission between various components connected therewith according to configuration information (i.e., data generated by compiling a program) generated based on configuration data (i.e., source such as C-language, HDL, et cetera, created by a program) which is supplied from the outside. The data memory 9 records data by way of the inter-operation unit network 8. The operation units 10 are set up so as to achieve the function related to configuration information based thereon and carry out the setup operation.

The configuration memory 3 loads (i.e., loads by utilizing a communication unit comprised by a PC (personal computer) for instance)) configuration information thereon from an external storage apparatus (e.g., PC; not shown herein) which stores the configuration information. And the configuration memory 3 receives a configuration switching condition signal generated based on a condition establishment signal (e.g., signal such as chip select) mainly transmitted by the operation units 10 of various reconfigurable components constituting the configuration data load unit (not shown herein) and operation unit group 2. Generation of a configuration switching condition signal, for example, is based on the above mentioned condition establishment signal and configuration data from the configuration memory 3.

The sequencer 4 generates an address of the above mentioned configuration information to be read out of the configuration memory 3 based on a switching condition signal.

A patent document 1 discloses a configuration to array in a form of columns and rows a large number of processor elements for carrying out individually data processing in response to instruction codes whose data are respectively set up and for controlling switching a mutual connection relationship, in which a state management unit switches an instruction code one after another for the large number of processor elements. But, there is plural number of state management units which operate in collaboration through mutual communication and a large number of processor elements are segmented into the same plural number of element areas. Since a plurality of state management units are respectively allocated to the plurality of element areas and connected to processor elements, the plurality of state management units is capable of managing a small scale plurality of state transitions individually. Also a plurality of state management units is capable of managing one state transition on a large scale by collaborating with one another.

And a patent document 2 has proposed an array type processor which is capable of being compact and high performance by connecting arrayed processor elements electrically by programmable switches, furnishing a data path unit for mainly carrying out an arithmetic logic operation and a state transition management unit independently for controlling state transitions and accomplishing specific configuration according to the respective processing purposes.

And, an operation processing with a large operating load such as division processing is sometimes required when carrying out operations with a reconfigurable processing apparatus comprised as described above. A method has been proposed to carry out an operation in such a case by using a dedicated hardware accelerator shown by FIG. 3 and making a CPU or DMAC (direct memory access controller) intervene in the operation processing.

In the case of carrying out operation processing such as division processing by the method as shown by FIG. 3, however, a CPU 31 or DMAC has to intervene in order to simplify a processing start or data transmission. While this makes the interface be integrated, there is a problem of decreased operation processing capacity because of the intervention of the CPU 31. On the other hand, when considering the case of not causing the CPU 31 to intervene, it becomes difficult to integrate the interface, hence requiring consideration of the interface every time hardware is designed anew, resulting in difficulty of reusing a design asset simply.

Accordingly, a method can be conceived to furnish the above described reconfigurable processing apparatus having a plurality of clusters with a divider, et cetera, directly. If one is furnished for the operation unit group 2 (i.e., ALU array part) within the cluster 1 for example, it is possible to not only improve processing capability as above but also to improve the processing capability further by providing hardware specialized for an application in the operation unit group 2 (i.e., ALU array part) in place of a general purpose operation unit such as divider.

However, (1) a general purpose operation unit such as divider is a large scale circuit as compared to a multiplier or ALU, (2) usage frequency is lower than the ALU or multiplier and therefore, if a divider or application specific engine is equipped in a reconfigurable arithmetic circuit, usage efficiency of operation unit per unit area goes down, hence leading to a cost increase, and (3) the equipment of an application specific engine causes a waste of resources because other applications will not use it, thus requiring a redesign to remove it.

It is then possible to improve an area or usage efficiency if an application specific engine such as a divider can be installed outside the cluster 1 so as to be shared among them. It is also possible to replace the application specific engine with a different application engine since it is external to the cluster 1.

In the case of installing it external to the cluster 1 and sharing it among a plurality of clusters, the following problems will occur: (4) it is not possible to start up processing without installing a CPU, et cetera, outside the cluster 1 to intervene, hence requiring some kind of start-up means, (5) a connection and control method for the cluster 1 is required for discretionary clusters 1 utilizing an application specific engine, (6) in the case of using a unique signal line, et cetera, for every application specific engine as with ordinary hardware, it is not possible to replace the application specific engine for a different application, thus requiring a system for enabling a replacement, and (7) in the case of sharing an application specific engine installed external to the cluster 1 among a plurality of clusters 1, a common control is required.

Though, the patent document 1 has disclosed a shared resource shared by two clusters 1, it must be controlled by one of the clusters 1. Patent document 2 has disclosed a multiplier external to the cluster 1, but the usage method or operation thereof is not disclosed.

[Patent document 1] laid-open Japanese patent application publication No. 2004-133781

[Patent document 2] laid-open Japanese patent application publication No. 2001-312481

SUMMARY OF THE INVENTION

The purpose of the present invention is to provide a reconfigurable processing apparatus enabling a plurality of clusters to utilize a shared functional unit such as an application specific engine through processing by using data and a valid signal (N.B.: this is the name of an actual signal herein, and the word "valid" is not a generic adjective herein) received from the clusters and going through a network between clusters.

One aspect of the present invention is a reconfigurable processing apparatus, comprising one or more clusters which are reconfigured based on configuration information, comprising a shared functional unit shared by the one or more clusters, external to the clusters, wherein the shared functional unit comprises an input unit for accepting input data and an input valid signal from the cluster, an functional unit for carrying out operation processing of the input data received with the input valid signal when the input unit receives the input valid signal, and an output unit for outputting, to the cluster, output data as an operation result of the functional unit and an output valid signal for notifying the cluster of the output destination of the aforementioned output data.

The shared functional unit preferably generates an ID which is an identifier signal and notifies the cluster of an output destination of the output data when accepting the input data and input valid signal from a plurality of the clusters.

The shared functional unit may also be comprised to carry out operation processing by utilizing a pipeline configuration.

The pipeline may be comprised to generate an internal valid as well as an ID which is an identifier signal, and transmit, by way of the pipeline, the ID as well as processed data which results from operation on the input data when receiving the input data and the input valid signal from a plurality of the clusters.

The comprisal of the shared functional unit is preferably an application specific engine for carrying out a unique operation.

The comprisal of the shared functional unit may also be equipped by a plurality of application specific engines, each of which carries out a unique operation.

The shared functional unit may also be comprised to generate an operation processing selection signal based on the input data and the input valid signal from the cluster, and switch the application specific engines comprised by the shared functional unit according to the operation processing selection signal.

The operation processing selection signal may also be generated by selecting, and establishing, a table made up of operation processing code corresponding to an application specific engine comprised by the shared functional unit, inputting the operation processing code which is the input data in order for the cluster to select the application specific engine, and selecting a signal corresponding to the input data for controlling a switch of the application specific engine.

An input unit and an output unit comprised by the shared functional unit may also be equipped with a selector reconfigurable based on configuration data.

The input unit and output unit comprised by the shared functional unit may also be equipped with a crossbar switch.

The input unit comprised by the shared functional unit may also be multi-port.

The output unit comprised by the shared functional unit may also be multi-port.

The above described comprisal makes it possible to start up the shared functional unit with a valid signal without a specific control signal by a reconfiguration arithmetic circuit on the part of a user. It is also possible to utilize the shared functional unit just by a discretionary cluster sending data along with a valid signal, and without sending a control signal from a user cluster, as a result of connecting the shared functional unit to the network connecting the clusters.

Meanwhile, the shared functional unit is started up by a valid signal and simultaneously processes the received data. A comprisal of an application specific engine according to this rule eliminates the necessity of defining a special signal for every different application, thereby making it easy to replace an application specific engine.

Furthermore, each cluster being able to share the shared functional unit without a control signal, and forming a pipeline configuration, enables parallel data processing to be carried out from different ports in each stage.

The present invention is comprised to furnish a shared functional unit external to the clusters so as to be shared among them, thereby improving area efficiency and usage efficiency. And because the shared functional unit is outside the cluster, replacement of the application specific engine is easy, hence enabling effective use of design resources.

BRIEF DESCRIPTION OF THE DRAWINGS

FIG. 3 shows a method of operation processing by using a dedicated hardware accelerator so as to make a CPU or DMAC intervene therein;

FIG. 7 exemplifies a case of connecting a cluster C with a shared functional unit A;

FIG. 9 shows a shared functional unit comprising multiports;

FIG. 13 exemplifies a comprisal of a divider;

FIG. 14 exemplifies a comprisal of a polar functional unit;

FIG. 17 shows how a shared functional unit is plurally functionalized;

FIG. 18 is a table of operation codes;

DESCRIPTION OF THE PREFERRED EMBODIMENTS

The following is a detailed description of the preferred embodiment of the present invention while referring to the accompanying drawings.

First Embodiment

Figure 1:
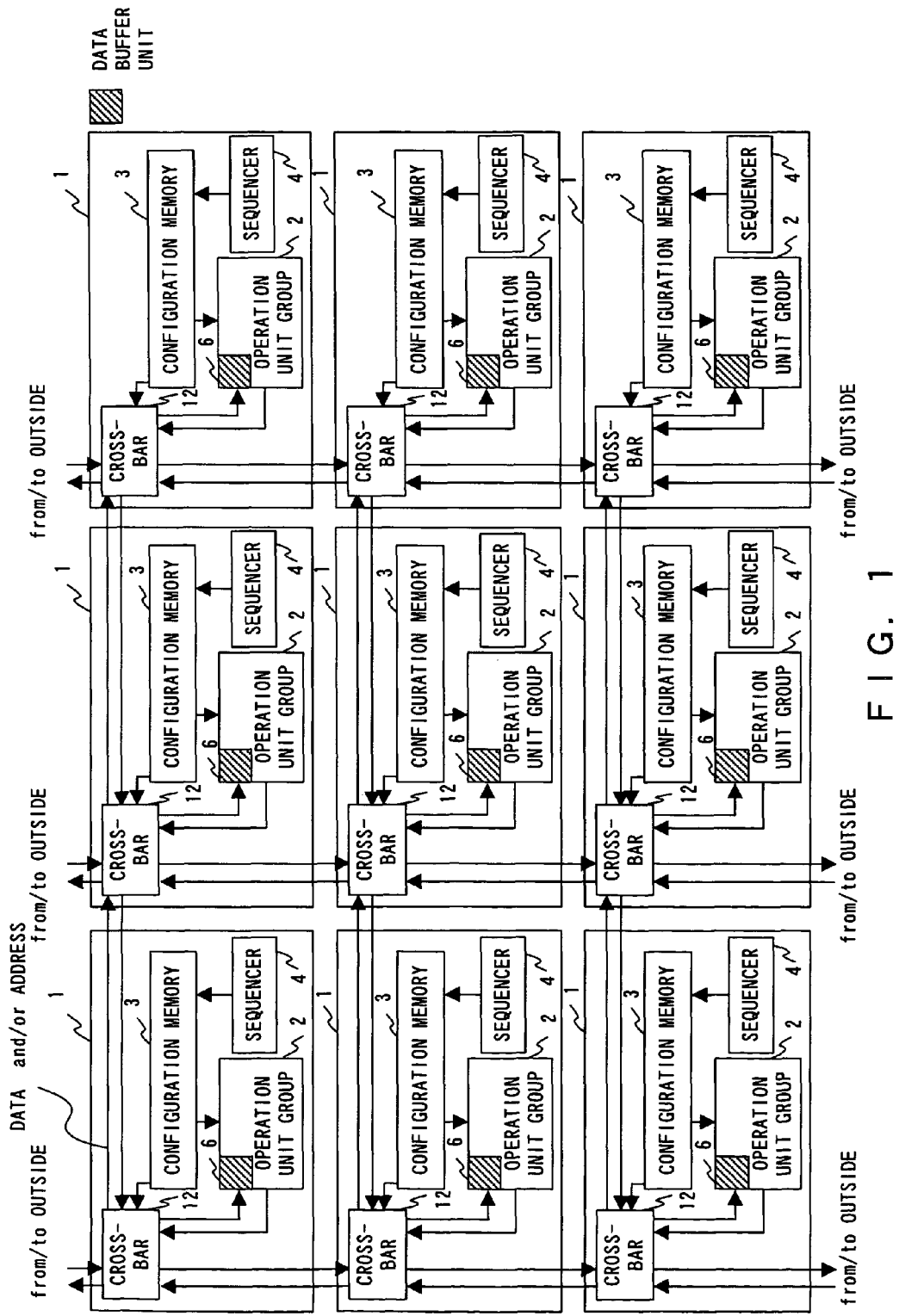
FIG. 1 exemplifies a cluster.
Figure 2:
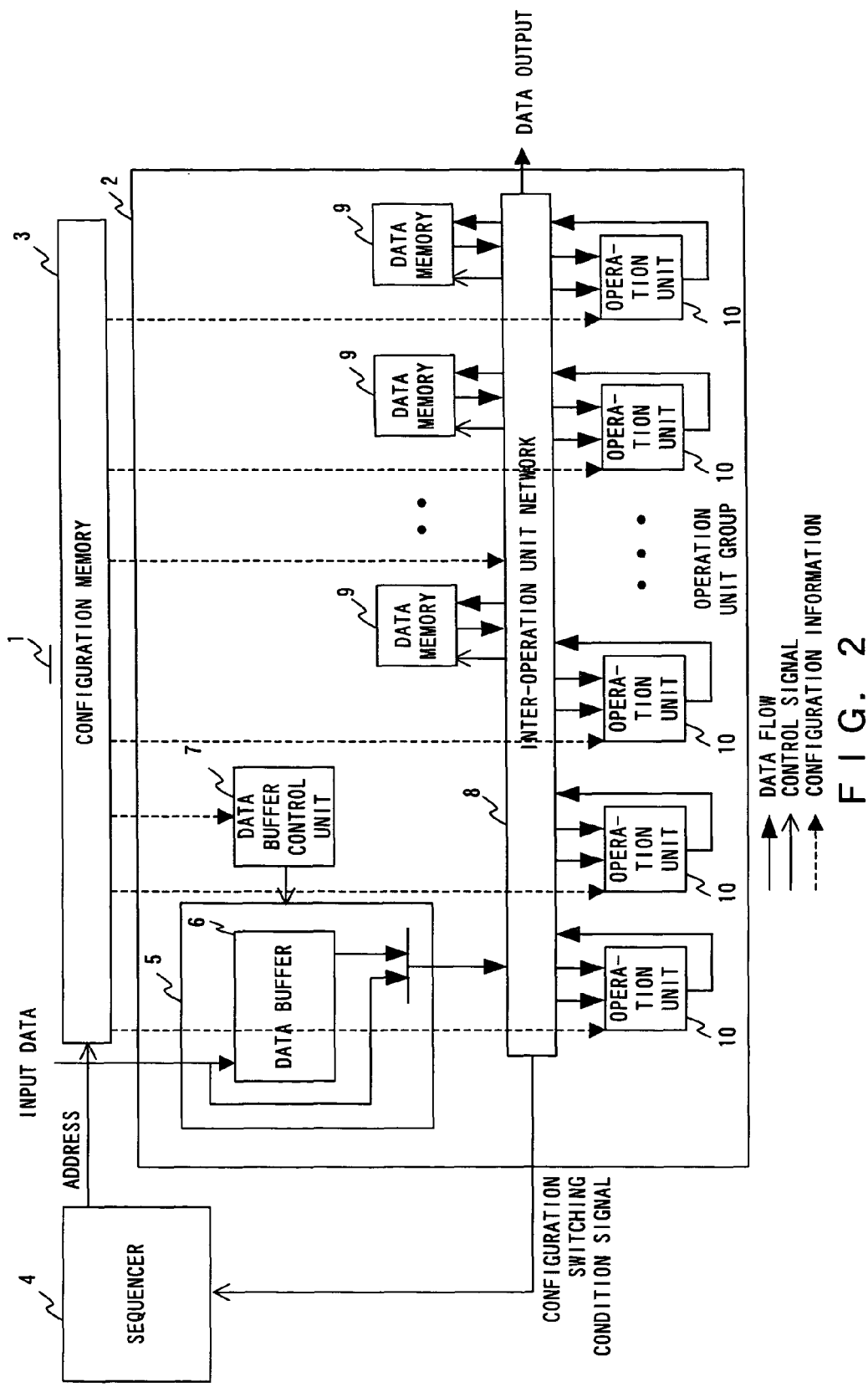
FIG. 2 is an illustrative block diagram conceptually showing a comprisal of a cluster within a conventional reconfigurable processor.
Figure 4:
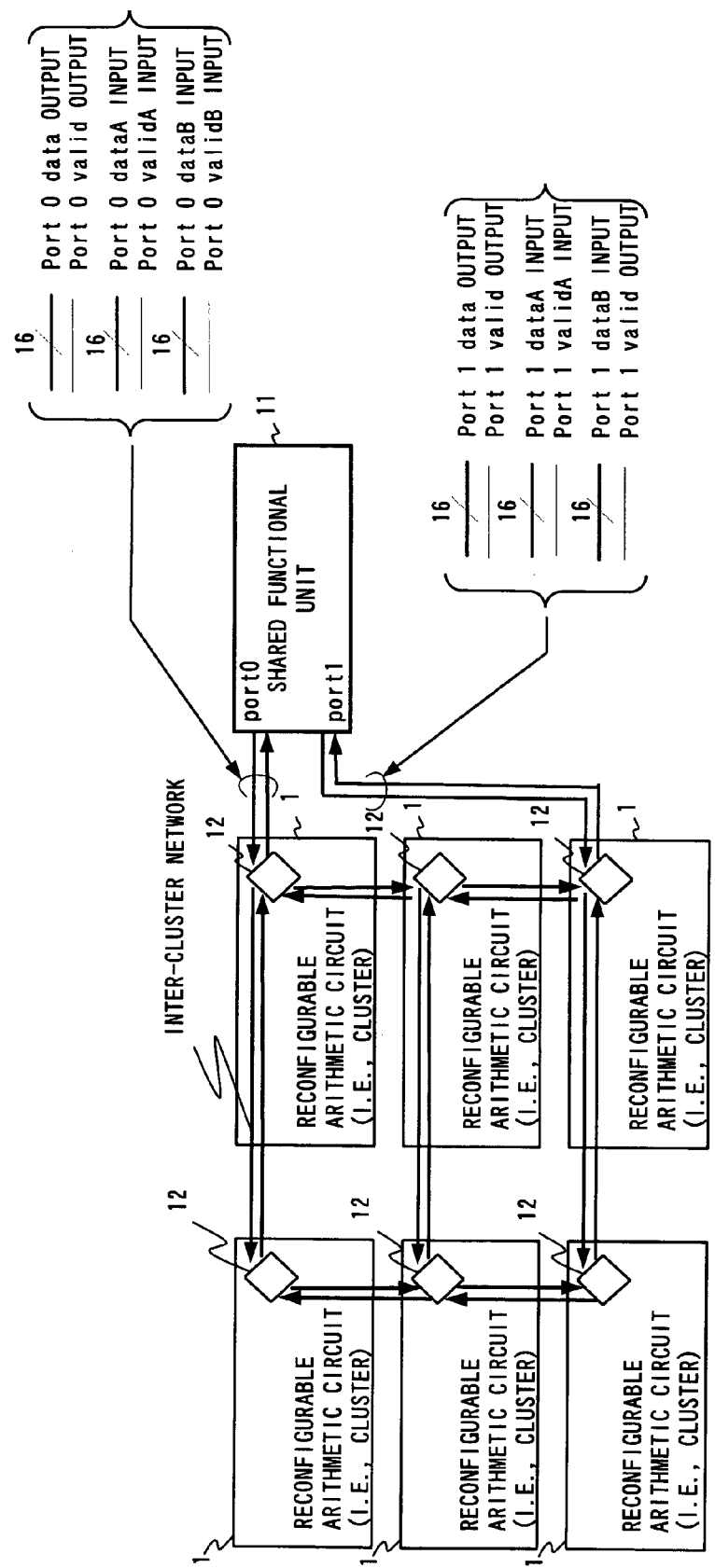
FIG. 4 shows the comprisal of cluster 1 and shared functional unit 11.

FIG. 4 shows the comprisals of cluster 1 and shared functional unit 11. Clusters are interconnected by an inter-cluster network and a plurality of clusters 1 are connected to the shared functional unit 11 by ports (i.e., port 0 and port 1) (i.e., input unit and output unit). The port 0 and port 1 shown by FIG. 4 are configured to connect the shared functional unit 11 to cluster 1, equipping a port 0 data input (16-bit bus) and a port 0 valid input as inputs for example; plus a port 0 data output (16-bit bus) and a port 0 valid output as outputs, equipping a port 1 data input (16-bit bus) and a port 1 valid input as inputs for example; plus a port 1 data output (16-bit bus) and a port 1 valid output as outputs.

Figure 5:
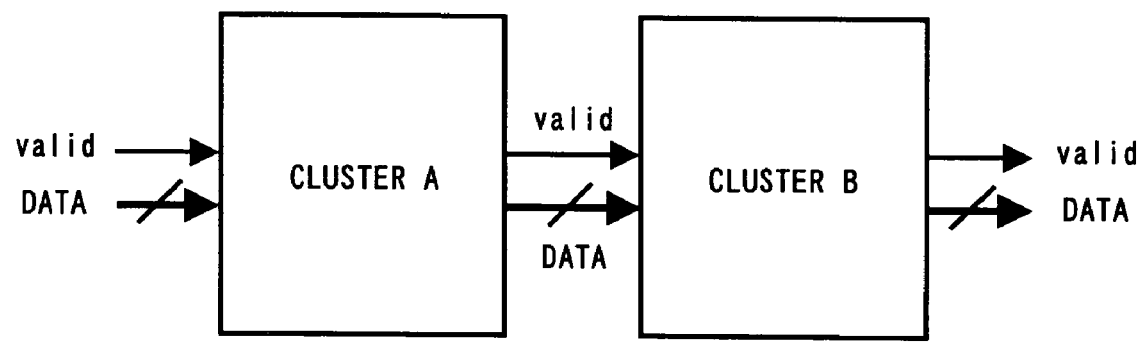
FIG. 5 describes an action of a cluster.

FIG. 5 describes an action of a cluster. Cluster A is actuated by a valid drive by receiving data and a valid signal. And the inter-cluster network is configured to transmit data made up of data and a valid signal.

For example, data and a valid signal are input from externally to the cluster A which then processes the aforementioned data, followed by the cluster A outputting the processing result to the cluster B in the form of data and a valid signal.

Then, having received them, the cluster B processes the aforementioned data of the data and valid signal to output in the form of data and a valid signal anew after the processing therein.

Figure 6:
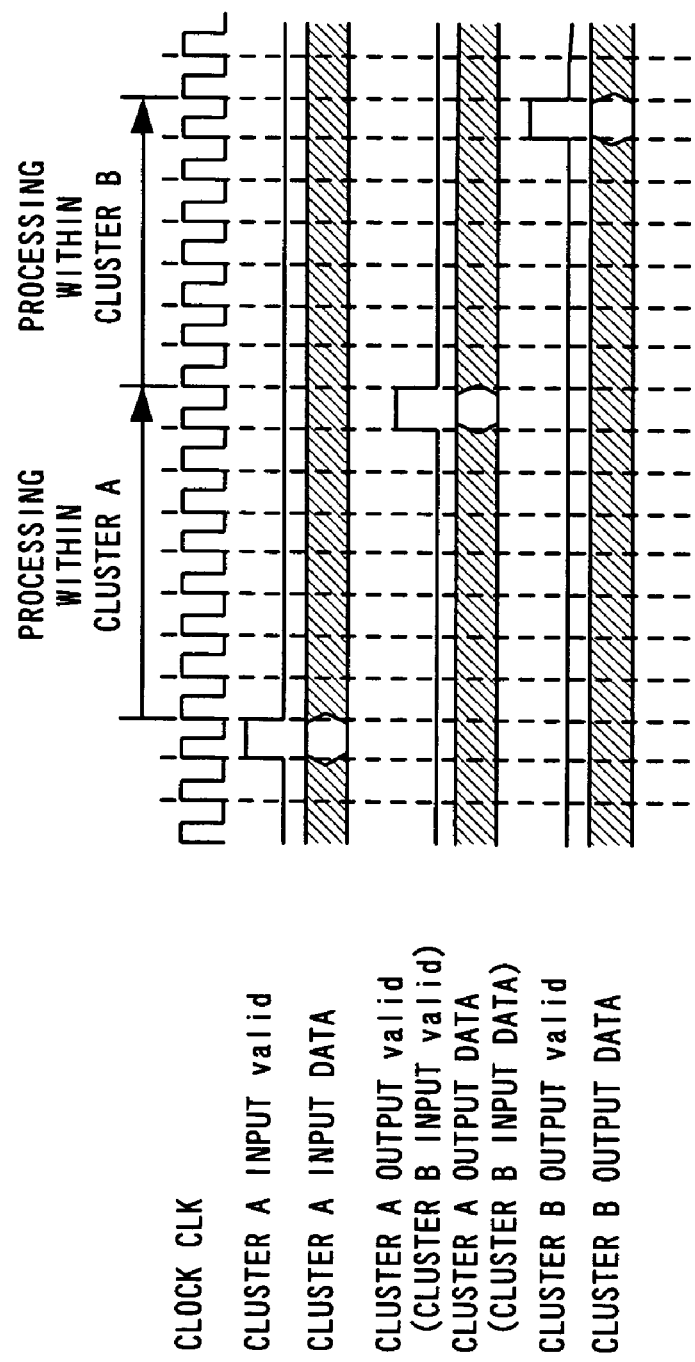
FIG. 6 shows the action shown by FIG. 5 in a time chart.

FIG. 6 shows the above described action shown by FIG. 5 in a time chart. The cluster A takes in and processes therein cluster A input data, i.e., input data thereto, and cluster A input valid signal, i.e., a valid signal thereto, at a falling edge of a clock CLK. The present embodiment is configured to carry out a quantity of eight cycles per clock CLK as a processing within the cluster A. Here, an input signal to the cluster B is processed within the cluster A to be prepared as cluster A output data (is equal to cluster B input data) and cluster A output valid (is equal to cluster B input valid) at the eighth cycle. Then the cluster B takes in and processes therein to output to the next cluster 1 or shared functional unit 11 as cluster B output data and a cluster B valid signal.

FIG. 7 exemplifies a case of connecting a cluster C with a shared functional unit A. Just by targeting an application domain, installation of a shared functional unit 11, as an external application specific engine, carries out complex processing commonly used even if the algorithm is a little different.

In the case of shared functional unit A, as with the inter-cluster action (shown by FIG. 5), data plus a valid signal carry out a drive and data transmission. That is, data plus a valid signal enable a data exchange with a discretionary cluster C. This makes a characteristic of the shared functional unit A as discretionary, allowing a replacement thereof with an engine required for an application domain. In the case of FIG. 7, data 0 and a valid 0 signal are the input data to the cluster C which then operates on them therein to acquire data 1 and a valid 1 signal as an input to the shared functional unit A.

The data 1 and valid 1 signal processed within the shared functional unit A are then operated on to acquire data 2 and a valid 2 signal in order to return the processing result to the cluster C which in turn carries out processing therein to output data 3 and a valid 3 signal.

Figure 8:
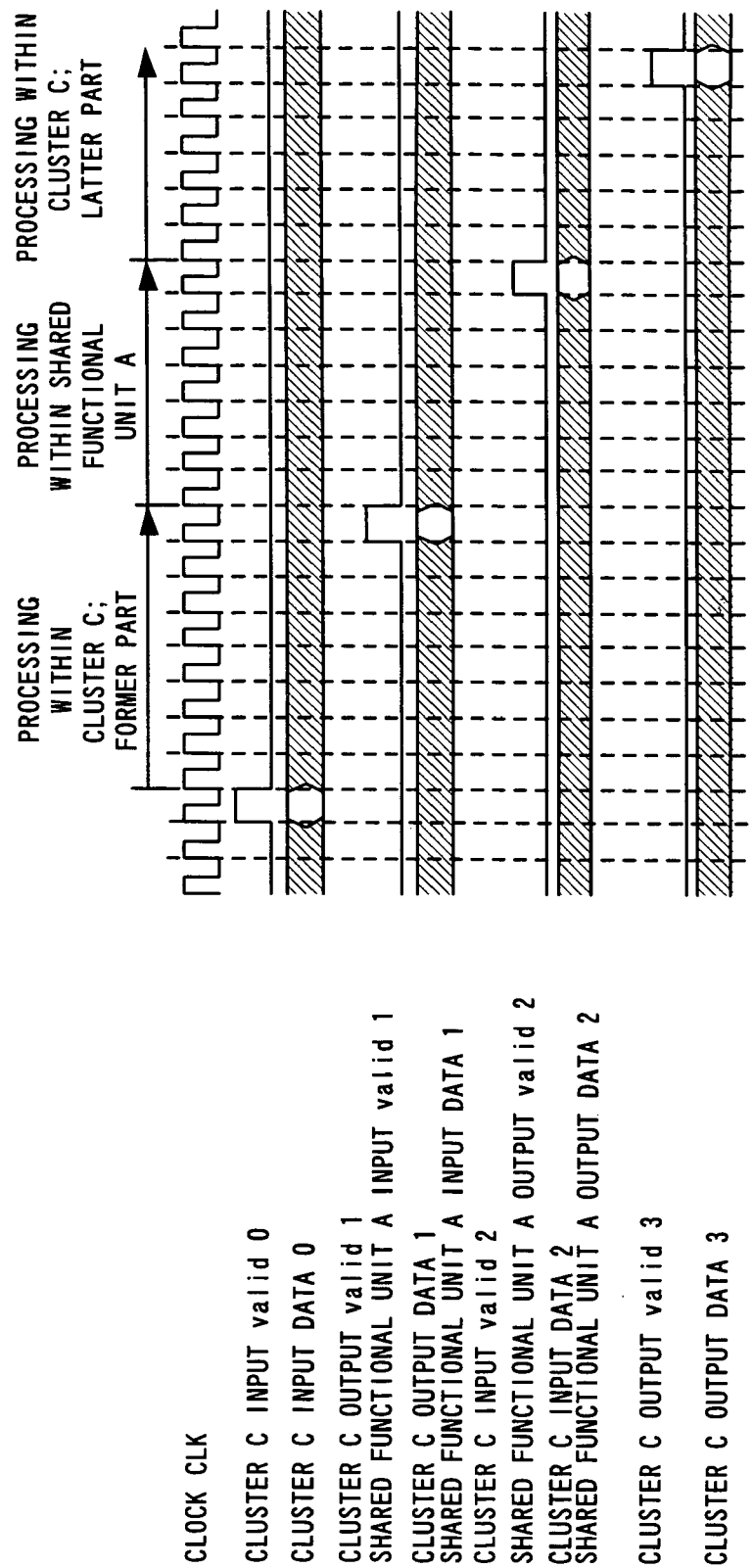
FIG. 8 shows the actions of cluster C and shared functional unit A in a time chart.

FIG. 8 shows the actions of cluster C and shared functional unit A in a time chart. The cluster C takes in cluster C input data 0 and a cluster C input valid 0 signal at a rising edge of clock a CLK, processes them therein and inputs cluster C output data 1 (i.e., shared functional unit input data 1) and a cluster C output valid 1 signal (i.e., shared functional unit input valid 1) to the shared functional unit A on the eighth clock cycle. The shared functional unit A carries out operation processing for the received input and calculates cluster C input data 2 (i.e., shared functional unit output data 2) and cluster C input valid 2 signal (i.e., shared functional unit output valid 2) on the seventh clock cycle as an output result. Then the cluster C receives the input, carries out the latter part of the processing to calculate cluster C output data 3 and a cluster C output valid 3 signal on the sixth clock cycle.

Note here that the method of taking in data at the rising edge of clock, and the number of clocks required for each process are not specifically limited of course in the respective internal processing by the clusters A, B and C, and the shared functional unit A.

Incidentally, FIGS. 5 and 4 show the case of a crossbar switch 12 connecting between the clusters, which is one method for accomplishing an inter-cluster connection. But any other method may be applied if such a method enables data transfer by a valid drive by using data plus a valid signal.

The next description is of a comprisal of the shared functional unit 11 in outline. The shared functional unit 11 is equipped by an input port (i.e., input unit), functional unit and output port (i.e., output unit). And the above described comprisal shown by FIG. 7 is of a simple one with only one input and one output port. But it is actually possible to use it as a multi-port shared functional unit 11. An example comprisal is to furnish a plurality of clusters 1 with one shared functional unit 11 which may then be equipped by the number of input and output ports equivalent to that of the number of clusters.

Alternatively, if the number of input and output ports equivalent to that of the number of clusters are not equipped, it is possible to switch connections to the shared functional unit 11 so as to disconnect it from the cluster 1 when not using the shared functional unit 11 and to reconnect it again when required. Switching connections may be set by the unit of clock, or can be fixed until configuration information is established anew.

FIG. 9 shows a shared functional unit comprising multiple-ports. A shared functional unit 11 receives an input by way of input ports 0 through N−1 (N is an integer) and processes it. And an operation result output by a functional unit 92 is then output from output ports 0 through M−1 (M is an integer) by way of a multi-port output control unit 93 (i.e., output unit). Here, M may or may not be equal to N.

In this case, if there is competition in a multi-port input control unit 91 (i.e., input unit), an input port with a smaller port number takes precedence, for example, and one input port will be selected by discarding other data. As for the output ports, only one output port will be made active by port information (i.e., valid signal and ID, i.e., output port identifier signal) which is generated from a valid signal. Note that the data is preferably the same for all the ports, but there is no need to output to all the ports. Incidentally, the port information is input with a delay equivalent to a latency of the functional unit 92 so as to control the multi-port output control unit 93.

Figure 10:
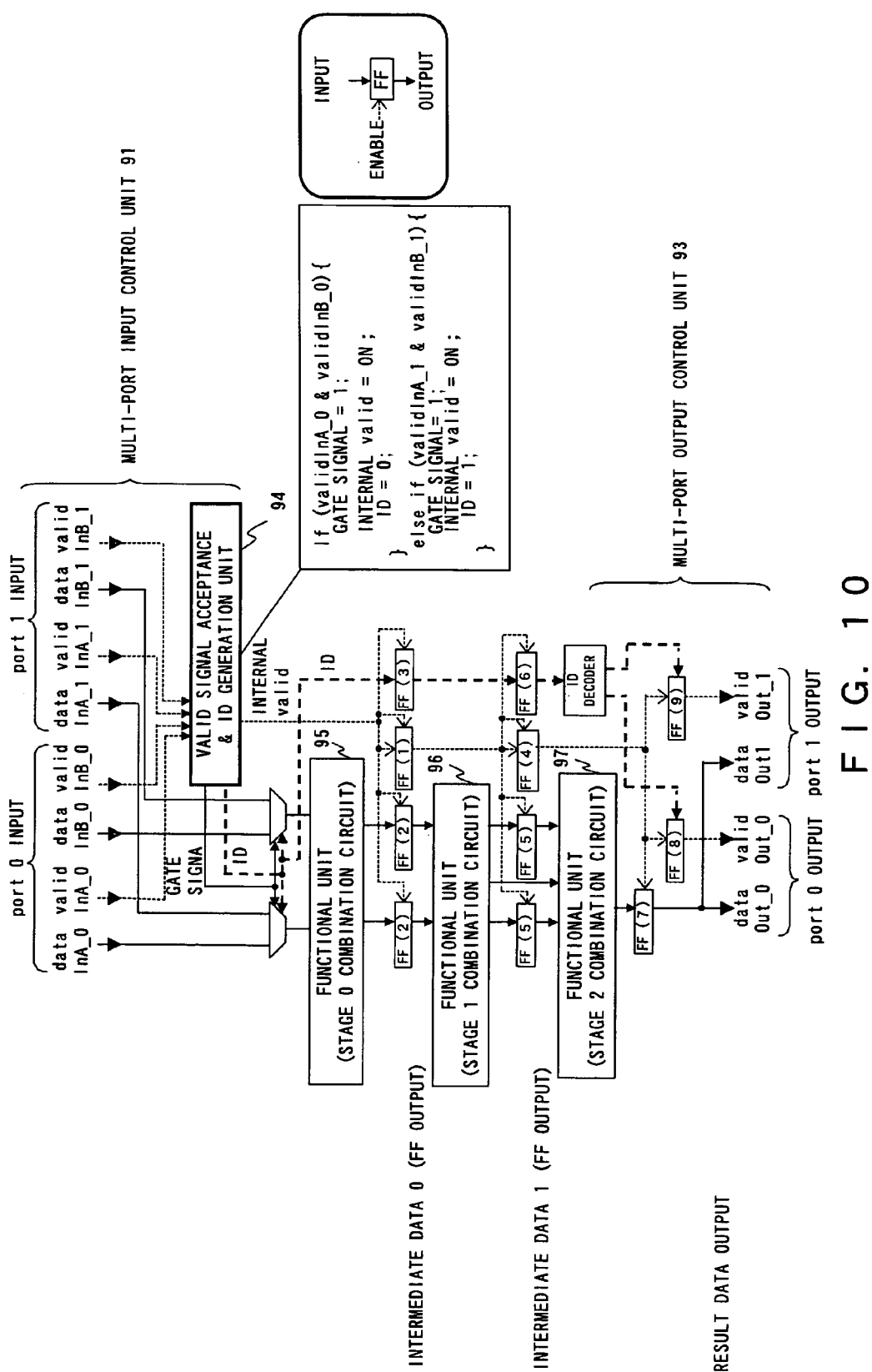
FIG. 10 shows a fundamental comprisal of a shared functional unit (with two ports)

FIG. 10 exemplifies a fundamental comprisal of a shared functional unit 11 with two ports. The above described multi-port input control unit 91, shown by FIG. 9, comprised by the shared functional unit 11, comprises a valid signal acceptance & ID generation unit 94 which generates an internal valid signal upon receiving valid signals (i.e., validInA_0, validInB_0, validInA_1 and validInB_1), that is, inputs from the port 0 side or port 1 side, and carries out operation processing in the manner of a pipeline by using the internal valid signal. The aforementioned valid signal acceptance & ID generation unit 94 generates an ID in order to indicate which of the input ports the data has been received from and selects the port the data is received from based on the ID.

Here, the valid signal acceptance & ID generation unit 94 carries out an operation as seen in the source shown by FIG. 10 and, if validInA_0 and validInB_0 are valid, selects whether or not the functional unit takes in dataInA_0 and dataInB_0 according to a gate signal. If the gate signal is "1" (i.e., take in), the input data is taken into the functional unit 95. At the same time, the internal valid is turned "on" and the ID is set to "0".

Meanwhile, if validInA_1 and validInB_1 are valid, selects whether or not the functional unit takes in dataInA_1 and dataInB_1 according to a gate signal. If the gate signal is "1" (i.e., take in), the input data is taken into the functional unit. At the same time, the internal valid is turned "on" and the ID is set to "1".

Note that the configuration of taking in data according to the gate signal may use an AND mask, et cetera, to make one the input of the input data and the other input of the AND gate the gate signal. Incidentally, generation of a gate signal by a valid is not necessarily required.

Furthermore, if a valid input is off, a selector for selecting an input port (i.e., port 0 or 1) may select either one in priority so as to carry out an operation for the stage 0. The reason is that an internal valid is off if a valid input is off. Consequently, since the value of the intermediate data 0 is not written in the last FF (flip flop) at the stage 0, it will be the same as no calculation being done. However, the gate signal can stop an unnecessary action as described above and is effective in reducing power consumption.

Then, the ID is transferred through the pipeline along with processing data, the ID is decoded simultaneously with the stage where the operation completes (i.e., the functional unit of stage 2 in the present embodiment) generating a valid signal for selecting an output port. The valid signal is output to the output port.

Then, the processing data is output to both output ports. (This example issues to both, but a selective issue based on the ID may be performed.)

The output data and valid signal are sent to a cluster 1 which has issued the input data. Upon receiving the valid signal, the cluster 1 processes the data received along therewith.

The functional unit shown by FIG. 9 configures the functional units 95 through 97 (i.e., combination circuits of the stages 0 through 2) as shown by FIG. 10 to operate on the input data through the input port for example; and stores the operation result in the FF (flip flop) (2) of the intermediate data 0 through 2. The above described ID is also stored in the FF. Then, followed by enabling each FF (2) of the intermediate data 0, FF (3) of the ID and FF (1) of the internal valid by the internal valid signal, to be output to the next functional unit (of the stage 1) 96 which in turn operates likewise and stores the operation result in the FF (5) of the intermediate data 1. The ID is also stored in the ID-use FF (6). Then enables each FF (5) of the intermediate data 1, FF (6) of the ID and FF (4) of the internal valid by the internal valid signal to output to the next functional unit (of the stage 2) 97.

The functional unit (of the stage 2) 97, receiving the output of the functional unit (i.e., stage 1) 96 as input carries out the operation processing of the functional unit (of the stage 2) 97 to store the processing result in the FF as output.

Meanwhile, the multi-port output control unit 93 decodes by the ID decoder to determine a valid signal (i.e., validOut_0 or validOut_1) of which output port (i.e., port 0 output or port 1 output) is to be validated and stored in the FFs (8) and (9).

This is followed by outputting to the output ports (i.e., port 0 output and port 1 output) when the FFs are enabled by the internal valid.

Figure 11:
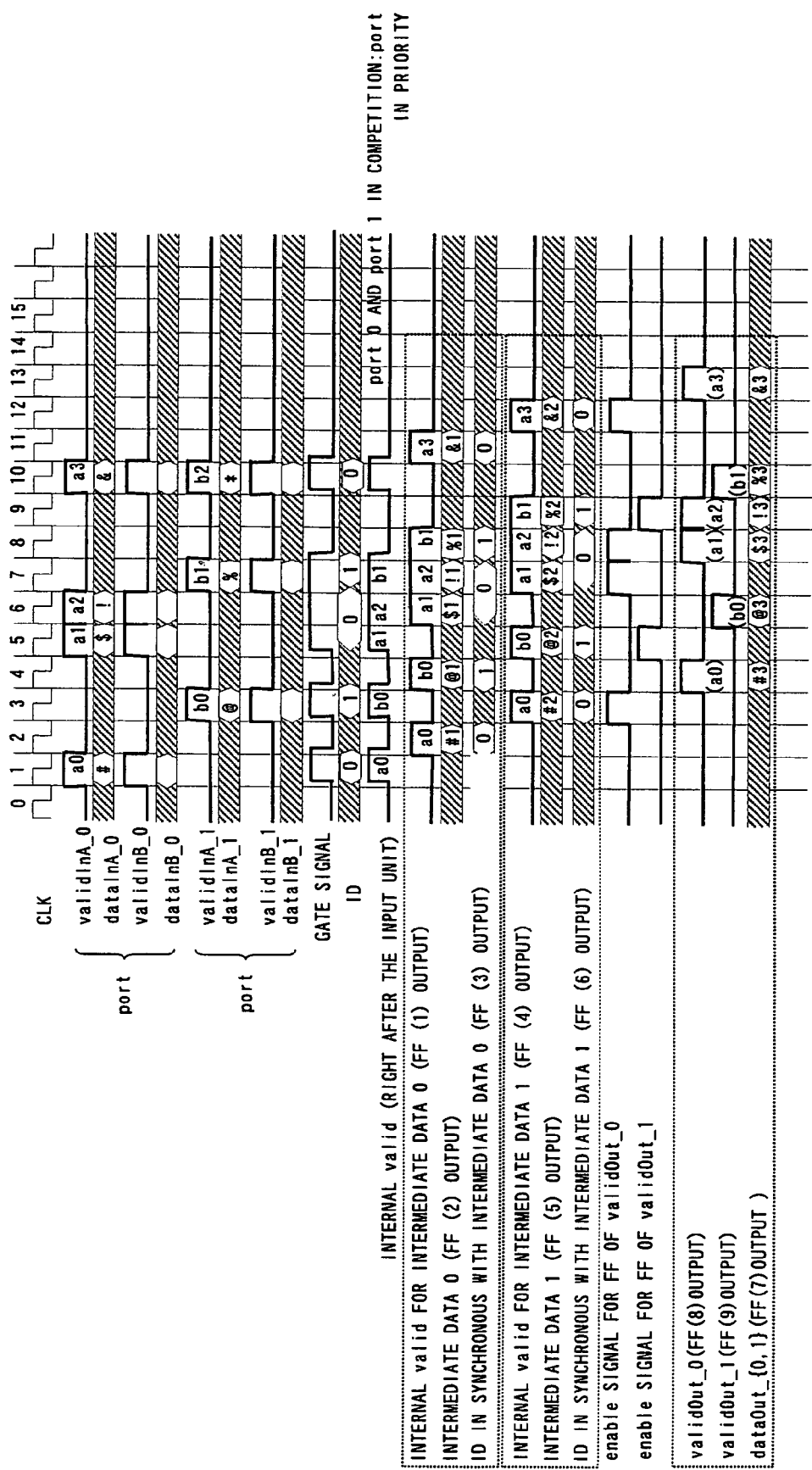
FIG. 11 shows an action of the comprisal shown by FIG. 10 in a time chart.

Next, FIG. 11 shows an action of the comprisal shown by FIG. 10 in a time chart. Input data is established and taken in at a rising edge of the clock CLK.

Within a period of CLK 1, data and a valid signal are input from the cluster 1 to the shared functional unit 11, and "a0" for validInA_0 (i.e., high signal in the present embodiment) and data for dataInA_0 (e.g., a 16-bit wide data "#") are transferred, respectively. Also likewise, high signals for validInB_0 and data for dataInB_0 are respectively transferred.

The valid signal acceptance & ID generation unit 94 generates a gate signal and ID based on the above described valid signal. The ID selects the port 0 side "0", while the internal valid (right after the multi-port input control unit 91) selects "a0". Here, the reason why the gate signal and "a0" are delayed from the rising edge of CLK 1 is due to operation processing by the valid signal acceptance & ID generation unit 94. Then the functional unit (at stage 0) 95 executes an operation based on the "#".

Then "a0", which is a signal of validInA_0, becomes an input to the FF (1) of the internal valid for the intermediate data 0. Also, the input of the FF (2) of the intermediate data 0 is given by a "#1" as a result of operation processing of "#" which is the data for dataInA_0. Also, "0" is provided as input to the ID FF (3) synchronously with the intermediate data 0. The FF (1), (2) and (3), set at the rising edge of CLK2, establish and output for the period of CLK 2.

During the period of CLK 2, an operation of the functional unit stage 1 is carried out based on "#1".

At this point, the valid signal "a0", ID "0", the operation result "#2" of the functional unit (at the stage 1) 96, which are all retained by the respective FFs relating to the above described intermediate data 0, are transferred to the FFs relating to the intermediate data 1. And "a0" is provided to the FF (4) of the internal valid as the intermediate data 1. And the operation result "#2" of the functional unit (at the stage 1) 96 is given to the input of the FF (5) of the intermediate data 1. And "0" is given to the input of the FF (6) of the ID synchronously with the intermediate data 1. The FFs (4), (5) and (6) are set at the rising edge of CLK 3, establishes, and outputs for the period of CLK 3.

During the period of CLK 3, data and a valid signal is input from the cluster 1 to the shared functional unit 11, "b0" for validInA_1 (i.e., a high signal in the present embodiment) and data for dataInA_1 (e.g., the 16-bit wide data "@") are transferred respectively. Also likewise, a high signal for validInB_1 and data for dataInB_1 are respectively transferred. The valid signal acceptance & ID generation unit 94 generates a gate signal and ID. The ID selects the port 1 side "1", while the internal valid (right after multi-port input control unit 91) selects "b0". Then the functional unit (at the stage 0) 95 executes an operation based on the "@".

Then, as a result of operation processing by the functional unit (at the stage 0) 95, "b0", which is a signal of validInA_1, becomes the input to the FF (1) of the internal valid for the intermediate data 0. And "@1" as a result of operation processing of "@" which is the data of dataInA_1 is input to the FF (2) of the intermediate data 0. And "1" is given as input to the FF (3) of the ID synchronously with the intermediate data 0.

Then, the functional unit (at the stage 2) 97 carries out an operation and provides "#3" as input to the FF (7) for the dataOut_0 and dataOut_1 as a result of operation processing based on "#2".

Meanwhile, the multi-port output control unit 93 decodes the ID with an ID decoder, to data which is encrypted based on a certain rule and decides which output port is to be validated. An "(a0)" is provided as input to the FF (8) for the validOut_0, validating the port 0 output. In the meantime, an input to the FF (9) for validOut_1 remains low.

The FFs (1), (2), (3), (7), (8) and (9) respectively take in the above described inputs at the rising edge of CLK 4, establish them and output for the period of the CLK 4 cycle.

During the period of CLK 4, validInA_1 "b0" is provided to the input of the FF (4) of the internal valid for the intermediate data 1. And "@2" as a result of the functional unit (at stage 0) 95 operating on "@1" which has been input from the dataInA_1 is input to the FF (5) of the intermediate data 1. And "1" is provided to the input of the FF (6) of the ID synchronously with the intermediate data 1. The FFs (4), (5) and (6) respectively take in the above described given inputs at the rising edge of CLK 5, establish them and output for the period of the CLK 5 cycle.

And data "#3" is outputted from an output port 0 with a result validOut_0 being validated and transferred to the cluster 1.

During the period of CLK 5, data and a valid signal are input to an input port of the shared functional unit 11 by the cluster 1 so that "a1" (i.e., a high signal) for validInA_0 and data (e.g., 16-bit wide data, "$") for dataInA_0 are transferred respectively. Likewise, a high signal for validInB_0 and data for dataInB_0 are transferred respectively. At the valid signal acceptance & ID generation unit 94, a gate signal and ID are generated. The ID selects the port 1 side "0", while the internal valid (i.e., right after the multi-port input control unit 91) selects "a1".

Then, "a1" which is a signal of the validInA_0 is given as input to the FF (1) of the internal valid for the intermediate data 0. And "$1" which is the processing result of operating on "$" which is data of the dataInA_0 is provided as input to the FF (2) of the intermediate data 0. And "0" is provided as input to the FF (3) of the ID synchronously with the intermediate data 0.

At this time, an operation by the functional unit (at the stage 2) 97 is carried out so that "@3" is provided as input to the FF (7) for the dataOut_0 and dataOut_1 as a result of the operation thereby based on "@2".

Meanwhile, the multi-port output control unit 93 decodes the ID using an ID decoder, to data which is encrypted based on a certain rule and decides which output port is to be validated.

The input of the FF (8) for the validOut_0 remains to low. A "(b0)" is provided to the input of the FF (9) for the validOut_1, thereby validating the port 1 output.

The FFs (1), (2), (3), (7), (8) and (9) respectively take in the above described inputs at the rising edge of CLK 6, establish them and output for the period of the CLK 6 cycle.

During the period of CLK 6, a data and valid signal are input to the input port of the shared functional unit 11 from the cluster 1, and "a2" (high signal in the present embodiment) for the validInA_0 and data (e.g., 16-bit wide data, "!") for the dataInA_0 are transferred respectively. Likewise, a high signal for the validInB_0 and data for the dataInB_0 are respectively transferred. At the valid signal acceptance & ID generation unit 94, a gate signal and ID are generated. The ID selects the port 1 side "0", while the internal valid (i.e., right after multi-port input control unit 91) selects "a2".

Then, "a2" which is a signal of the validInA_0 is provided as input to the FF (1) of the internal valid for the intermediate data 0. And "!1" which is the processing result of operating on "!" which is data of the dataInA_0 is provided as input to the FF (2) of the intermediate data 0. And "0" is provided as input to the FF (3) of the ID synchronously with the intermediate data 0.

At this time, an operation of "$1" is carried out by the functional unit (at the stage 1) 96, so as to acquire the operation result "$2". Then, a valid signal "a1", ID "0" and the operation result of the functional unit (at stage 1) 96 are transferred to the respective FFs relating to the above described intermediate data 1. The "a1" is provided as input to the FF (4) of the internal valid for the intermediate data 1. And "$1" is provided as input to the FF (5) of the intermediate data 1. And "0" is given as input to the FF (6) of the ID in synchronous with the intermediate data 1.

Meanwhile, data "@3" is output to the output port from a port 1 output with the validOut_1 being validated so as to transfer to the cluster 1.

The FFs (1), (2), (3), (7), (8) and (9) respectively take in the above described given inputs at the rising edge of CLK 7, establish them and output for the period of the CLK 7 cycle.

During the period of CLK 7, data and a valid signal are input to the input port of the shared functional unit 11 from the cluster 1, and "b1" (high signal in the present embodiment) for the validInA_1 and data (e.g., 16-bit wide data, "%") for the dataInA_0 are transferred respectively. Likewise, a high signal for the validInB_1 and data for the dataInB_1 are transferred respectively. At the valid signal acceptance & ID generation unit 94, a gate signal and ID are generated. The ID selects the port 1 side "1", while the internal valid (i.e., right after multi-port input control unit 91) selects "b1".

At this time, an operation result "%1" of the functional unit (at the stage 0) 95 based on a "%" is obtained. Then, a valid signal "b1", ID "1" and operation result "%1" of the functional unit (at the stage 0) 95 are provided as inputs to the respective FFs relating to the intermediate data 0. The "b1" is provided as input to the FF (1) of the internal valid for the intermediate data 0. And "%1" is provided as input to the FF (2) for the intermediate data 0. And "0" is provided as input to the FF (3) of the ID for the intermediate data 0.

Furthermore, the functional unit (at stage 1) 96 operates on the "!1" to obtain the operation result "!2". Then, a valid signal "a2", ID "0" and the operation result of the functional unit (at the stage 1) 96, i.e., "!2", are provided to the respective FFs relating to the above described intermediate data 1. The "a2" is provided as input to the FF (4) of the internal valid for the intermediate data 1. And the "!2" is provided as input to the FF (5) for intermediate data 1. And "0" is provided as input to the FF (6) of the ID synchronously with the intermediate data 1.

And, the functional unit (at the stage 2) 97 operates on the "$2" to obtain the operation result "$3. The valid signal "a1", ID "0" and the operation result of the functional unit (on stage 2) 97, i.e., "$3", are retained as inputs to the respective FFs relating to the above described intermediate data 2.

The "$3" as the operation result for "$2" is provided as input to the FF (7) for the dataOut_0 and dataOut_1.

The multi-port output control unit 93 decodes the ID "a1" with an ID decoder to acquire "(a1)" and selects the output port to be validated. The "(a1)" is provided as input to the FF (8) for the validOut_0, the input to the FF (9) for the validOut_1 is kept low, and therefore the validOut_0 is validated.

The FFs (1), (2), (3), (4), (5), (6), (7), (8) and (9) respectively take in the above described provided inputs at the rising edge of CLK 8, establish them and output for the period of the CLK 8 cycle.

During the period of CLK 8, the functional unit (at stage 1) 96 operates on the "%1" to obtain the operation result "%2". A valid signal "b1", ID "1" and operation result "%2" of the functional unit (at the stage 1) 96 are given as inputs to the respective FF relating to the intermediate data 1. The "b1" is provided as input to the FF (4) of the internal valid for the intermediate data 1. The operation result of the functional unit (at the stage 1) 96, i.e., "%2", is provided as input to the FF (5) for the intermediate data 1. And "1" is provided as input to the FF (6) of the ID synchronously with the intermediate data 1.

Furthermore, the functional unit (at the stage 2) 97 operates on "!2" to obtain the operation result "!3". A valid signal "a2", and the operation result of the functional unit (at the stage 2) 97, i.e., "!3" are provided as input to the respective FFs relating to the above described intermediate data 2. The "!3" as the operation result for "!2" is retained as input to the FF (7) for the dataOut_0 and dataOut_1.

The multi-port output control unit 93 decodes the ID "a2" using an ID decoder to acquire "(a1)" and select the output port to be validated. The "(a2)" is provided as input to the FF (8) for the validOut_0, the input to the FF (9) for the validOut_1 is kept low, and therefore the validOut_0 is validated.

Meanwhile, a data "$3" is output to the output port from an port 0 output with the validOut_0 being validated so as to transfer to the cluster 1.

The FFs (4), (5), (6), (7), (8) and (9) respectively take in the above described provided inputs at the rising edge of CLK 9, establish them and output for the period of CLK 9 cycle.

During the period of CLK 9, the functional unit (at the stage 2) 97 operates on the "%2" to obtain the operation result "%3". A valid signal "b1" and "%3" are provided as inputs to the respective FFs (i.e., FFs for result output) relating to the above described intermediate data 2.

The multi-port output control unit 93 decodes the ID "b1" using an ID decoder to acquire "(b1)" and selects which output port is to be validated. The input to the FF (8) for the validOut_0 is kept low, the "(b1)" is provided as input to the FF (9) for the validOut_1 and therefore the validOut_1 is validated.

Meanwhile, data "!3" is output to the output port from a port 0 output with the validOut_0 being validated so as to transfer to the cluster 1.

The FFs (7), (8) and (9) respectively take in the above described provided inputs at the rising edge of CLK 10, establish them and output for the period of CLK 10 cycle.

During the CLK 10, data "$3" is output to the output port from a port 1 output with the validOut_1 being validated so as to transfer to the cluster 1.

And during the CLK 10, the description is of an example in which input data is input to an input port within the same CLK period.

Data and a valid signal are input to the input port of the shared functional unit 11 from the cluster 1, and "a3" i.e., (signal high in the present embodiment) for validInA_0 and a data (e.g., 16-bit wide data, "&") for dataInA_0 are transferred respectively.

Furthermore, "b2" (i.e., signal high in the present embodiment) for validInA_1 and a data (e.g., 16-bit wide data, "*") for dataInA_1 are transferred respectively.

In this case, a gate signal is generated according to a source code of the above described valid signal acceptance & ID generation unit 94, and therefore the port 0 input side takes precedence. The ID selects the port 0 side "0", while "a3" is selected for the internal valid (i.e., immediately after the multi-port input control unit 91). This is followed by carrying out the operation processing by the respective functional units at the stages 0 through 2 in the same operations as described above.

Then, the multi-port output control unit 93 decodes the ID "a3" using an ID decoder to acquire "(a3)" and selects which output port is to be validated. The "(a3)" is stored in the FF (8) for the validOut_0 and the validOut_1 becomes validated, while leaving the FF (9) for the validOut_1 low.

In the subsequent CLK 13, data "&3" is output from the port 0 output as the output port validated by the validOut_0 and transferred to the cluster 1.

Figure 12:
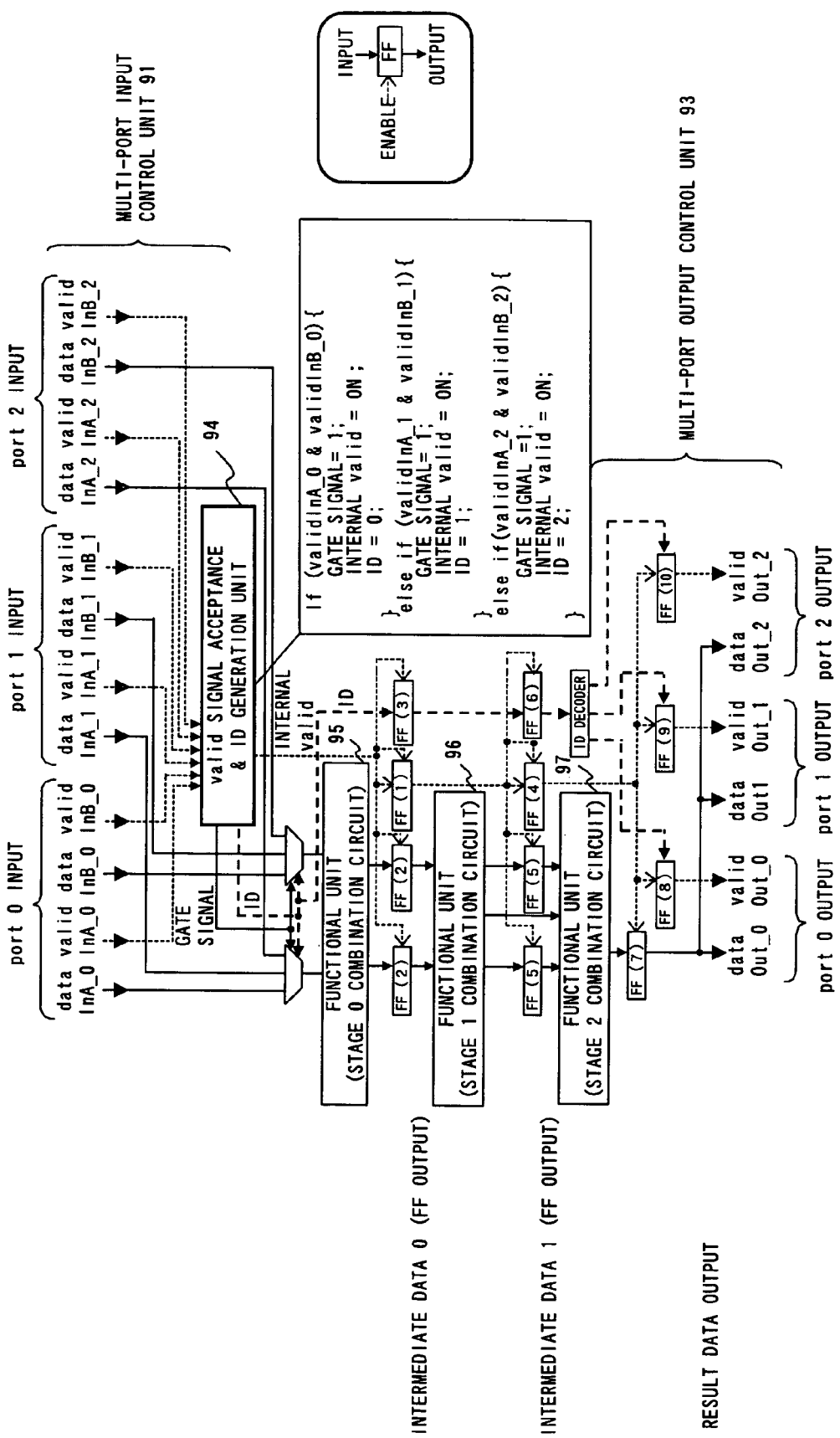
FIG. 12 shows a fundamental comprisal of a shared functional unit (with three ports)

FIG. 12 shows an example of the shared functional unit 11 with three input and output ports respectively. Even with an increased number of input ports, the valid signal acceptance & ID generation unit 94 has a priority order and provides an ID to each input port as in the case of two ports described in association with FIG. 10, thereby accomplishing the shared functional unit 11. Here, the valid signal acceptance & ID generation unit 94 carries out an operation as seen in the source shown by FIG. 12. If validInA_0 and validInB_0 are present, a selection is made as to whether or not to take in validInA_0 and validInB_0 into the functional unit depending on a gate signal. If the gate signal is "1", input data is taken into the functional unit, simultaneously turning "ON" the internal valid and setting an ID to "0".

If, however validInA_1 and validInB_1 are present, a selection is made as to whether or not to take in the validInA_1 and validInB_1 into the functional unit depending on a gate signal. If the gate signal is "1", input data is taken into the functional unit, simultaneously turning "ON" the internal valid and setting an ID to "1".

Furthermore, if validInA_2 and validInB_2 are present, a selection is made as to whether or not to take in the validInA_2 and validInB_2 into the functional unit depending on a gate signal. If the gate signal is "1", input data is taken into the functional unit, simultaneously turning "ON" the internal valid and setting an ID to "2". This is followed by carrying out operations, including the multi-port output control unit 93 decoding the ID, selecting an output destination, and outputting output data from a selected port.

Naturally, a plurality of stages of functional units may be furnished.

<An Example of Using a Divider as a Functional Unit for a Shared Functional Unit>

FIG. 13 exemplifies a comprisal of a divider.

A division requires a divisor and dividend. Accordingly DataB and a validB signal are assigned to data and a valid signal, respectively, for a divisor, while DataA and a validA signal are assigned to data and a valid signal for a dividend.

Referring to FIG. 13, a control unit 101 takes the two's complement of DataA and DataB, operates a division pipeline 102 (i.e., functional unit stage) for a plurality of stages (i.e., M-number of stages for this example), acquires the quotient and remainder, and transfers output data (i.e., the remainder) and output data (i.e., the quotient) to a multi-port output control unit; and simultaneously sets up a valid signal and transfers it thereto as output valid.

Here, a clock and reset are supplied to all the FFs. And a sign selection function, stall function, emergency stop function, and error detection function of the divider may be furnished. Also, a signal for an output divisor shown by FIG. 13 may be furnished, since a divider is sometimes used as a square root extractor.

<An Example of Using a Polar Functional Unit as a Functional Unit for a Shared Functional Unit>

FIG. 14 exemplifies a comprisal of a polar functional unit, an example configuration for producing a complex number by using a polar function, inputting data and a valid signal transferred from a multi-port input control unit. Input data 0 and 1 are input from a multi-port input control unit 111 by specifying an angle (i.e., angle from an X-axis to a radial vector expressed in radians; from $-2\pi$ to $2\pi$) along with data valid signals 0 and 1. Note that the input data 1 may be set up with a certain quantity (e.g., a data space unit by the length of the radial vector) and data valid 1 signal.

As the step S1 (simply "S1" hereinafter) of the flow chart shown by FIG. 15, accept input data and a valid signal, for instance, the input data 0 (i.e., angle $-2\pi$ to $2\pi$, 16-bit wide Q12 format, for example) and data valid 0 signal.

Figure 15:
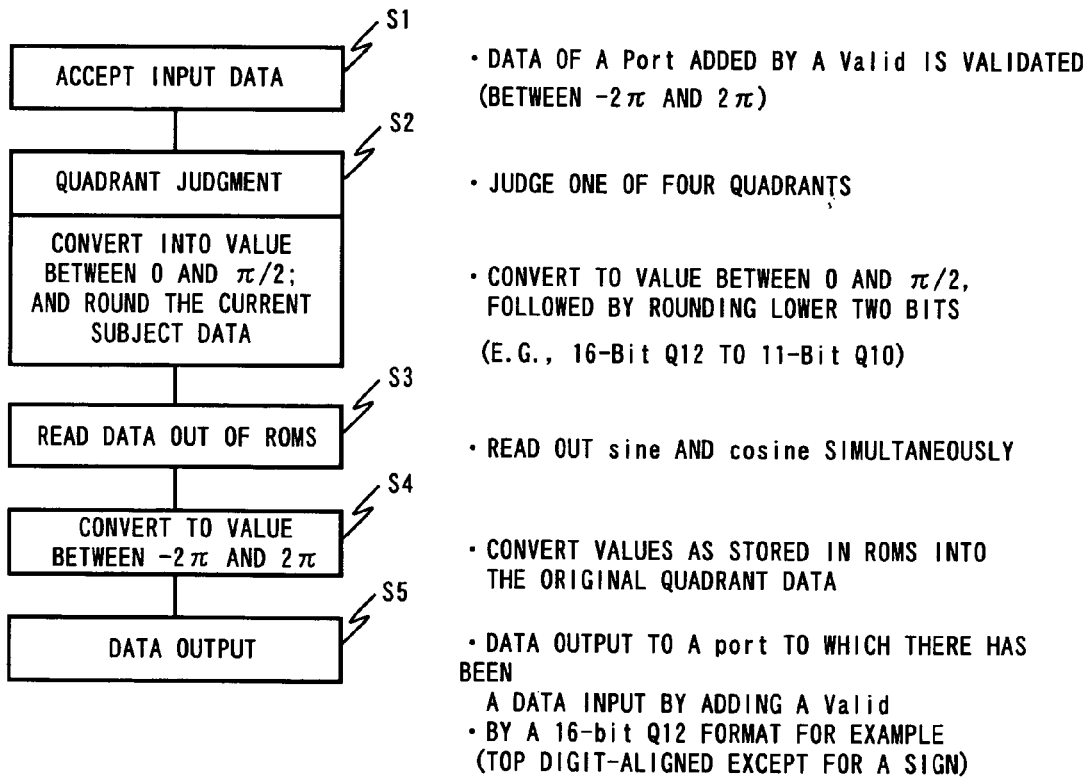
FIG. 15 shows an operation flow of the polar functional unit shown by FIG. 14.

Then the functional unit stage judges the quadrant using a quadrant judgment block 123 (FIG. 15; S2), placing the data in the appropriate quadrant of the four quadrants. Then a placing-in-first quadrant & subject rounding block 122 converts the current data into a value between 0 and $\pi/2$, followed by rounding the two lower bits, et cetera (e.g., convert from a 16-bit Q12 to 11-bit Q10 format). Then, read data out of the Sin_ROM 124 (e.g., an angle to sine conversion table) and the Cos_ROM 125 (e.g., an angle to cosine conversion table) simultaneously (NB: an example herein shows data within the ROM formatted as 13-bit Q12) (S3).

Then, the conversion-to-original quadrant blocks 126 and 127 each convert to a value between $-2\pi$ and $2\pi$ (S4), that is, convert each value, which is read out of the above described ROMs 124 and 125, into data of the original quadrant.

Then, the multi-port output control units 128 and 129 output data to the port which there has been data input to by adding a valid (S5). The output is made up of sine data (i.e., 16-bit Q12 format), sin_valid 0 and a sin_valid 1 signal (specifying an output destination port) as a sine calculation result; and of cosine data (i.e., 16-bit Q12 format), cos_valid 0 and a cos_valid 1 signal (specifying an output destination port) as a cosine calculation result.

<An Example of Using an Arctangent Functional Unit as a Functional Unit for a Shared Functional Unit>

Figure 16:
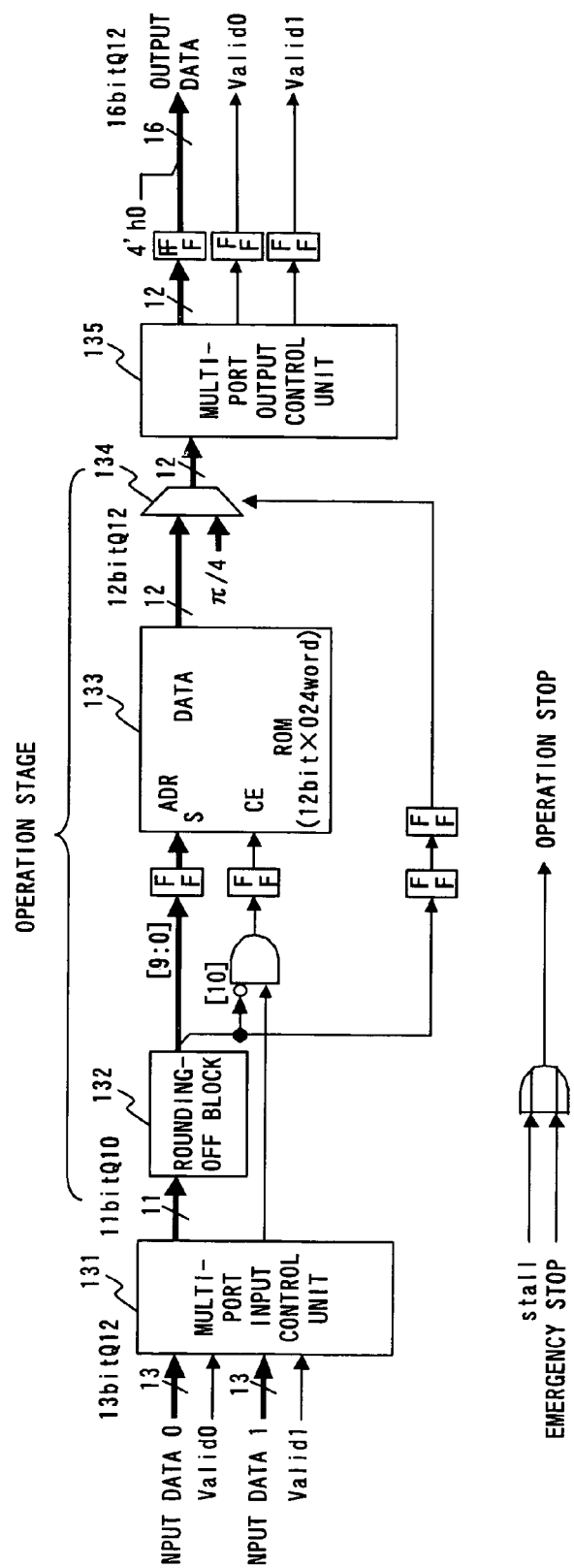
FIG. 16 exemplifies a comprisal of an arctangent functional unit.

FIG. 16 exemplifies a comprisal of an arctangent functional unit. A multi-port input control unit 131 receives real & imaginary parts as input data. A bus is furnished so as to receive input data 0 (e.g., 13-bit Q12 format) and a valid 0 signal, plus input data 1 (e.g., 13-bit Q12 format) and a valid 1 signal. An arctangent operation (at the operation stage) allows a rounding-off block 132 rounds off the input data and selects a value corresponding to the input data from a table within the ROM 133 which retains calculated values of arctangents for angles between $-2\pi$ and $2\pi$. Then, the block 134 acquires a calculation result by adding $\pi/4$ to output to the multi-port output control unit 135 which in turn transfers the output data and the result of selecting either the valid 0 signal or the valid 1 signal to the cluster 1.

The above described comprisal of starting up a shared functional unit by a valid signal enables a user cluster to start up the shared functional unit without control by a special control signal, et cetera. And connecting the shared functional unit with a network which connects clusters enables a discretionary cluster to start up the aforementioned shared functional unit with a valid signal just by sending data and a valid signal thereto and at the same time process the received data. This enables a user cluster to use the shared functional unit without sending a special signal.

Also, a comprisal of an application specific engine by the above described rule eliminates a need to set up a special signal for every different application, thereby making it easy to replace with another engine. Furthermore, each cluster can share the shared functional unit without a control signal, and carry out parallel processing of data from different ports at respective stages in a pipeline configuration as exemplified in the above description.

Further, it is naturally possible to build up a plurality of blocks which is made up of shared functional units and clusters within a reconfigurable processing apparatus.

Second Embodiment

FIG. 17 shows how a shared functional unit is plurally functionalized. A cluster 141 inputs a data input 0 and valid input 0, plus a data input 1 and valid input 1, plus data input 2 and valid input 2, to the shared functional unit 142 by way of a multi-port input control unit. This is followed by carrying out operation processing based on the data input to the data input 0 and valid input 0, plus the data input 1 and valid input 1, to output the operation result.

In this event, several cases for an operation processing unit 143 (i.e., operation stage) can be conceived, that is, the case of independent operation such as the above described application specific engine (e.g., division, polar operation and arctangent operation) and the case of processing, such as a square root extractor, to include a processing unit for independent operation such as division. In such a case, a decode unit 144 is furnished so as to switch operations between a divider and a square root extractor by inputting a data input 2 and a valid input 2.

The decode unit 144 is set up with an operation processing code table as shown by FIG. 18 so as to correlate between the operation processing code and processing content. The setup is such as No_Operation for the operation processing code "000", Reserved for "001", division without a sign for "010", division with a sigh for "011", and acquisition of a square root by square root extraction for "100". The data input 2 will be input by such an operation processing code prepared in advance.

The above is followed by selecting an operation processing selection signal corresponding to the operation processing code to transfer to the operation processing unit 143. An operation processing selection signal is a signal for switching and controlling the configuration of an application for the shared functional unit 142. Receiving an operation processing selection signal, if the operation processing code received by the operation processing unit 143 is "100", the shared functional unit 142 becomes a square root extractor, and thus the operation processing unit 143 processes square root operations.

Here, switching from a divider to a square root extractor is carried out by receiving an operation processing selection signal and changing a circuit configuration based on the content thereof. This is done by furnishing a selector (of any configuration capable of switching applications), et cetera, to reflect the content of an operation processing selection signal to a configuration of the shared functional unit 142.

Note that when inputting a valid signal (i.e., valid input 2 in the present example) to the decode unit 144, it is not necessarily required to specify a validity, and furthermore, a configuration of the decode unit 144 may not include a receiving port for a valid signal.

<An Example of Using a Square Root Extraction Functional Unit as a Functional Unit for a Shared Functional Unit>

Figure 19:
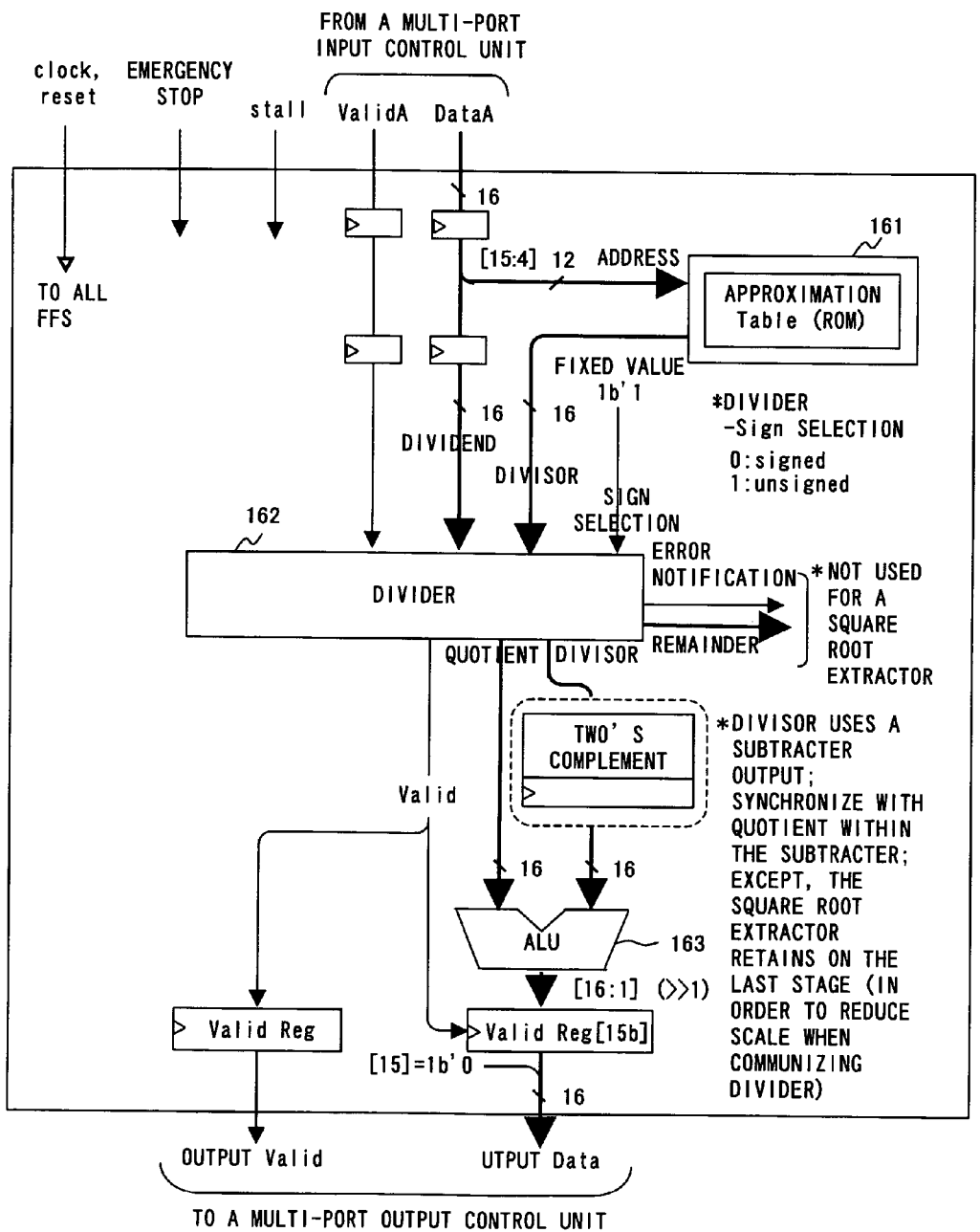
FIG. 19 shows a comprisal of a square root extractor.

FIG. 19 shows a comprisal of a square root extractor. As described above, DataA is input to the multi-port input control unit, as input data (i.e., a number to be square-rooted), together with validA, as a valid signal. Furthermore, the decode unit is notified of a square root extraction processing, although it is not shown by the figure, an application for square root extraction is switched on by generating an operation processing selection signal. FIG. 19 exemplifies the case of acquiring a square root through an approximation method.

From among divisor data within an approximation table (in a ROM for storing approximation values) 161 for extracting a square root, an appropriate divisor data is selected to make it a divisor. A divider takes the input data, DataA, as the dividend and carries out the same operation as the above described divider 162 (shown by FIG. 13) to acquire a quotient and divisor (e.g., the two's complement). Then an ALU 163 adds the quotient and divisor to result in output Data and output it to the multi-port output control unit along with an output Valid.

As described above, an equipment of a decode unit in the case of a shared functional unit (i.e., square root extractor in the present example) having a functional unit (i.e., divider in the present example) therein which is capable of independent operation makes the shared functional unit compact. Furthermore, a configuration of direct connection between the shared functional unit and decode unit is also possible in place of via a cluster.

Third Embodiment

Figure 20:
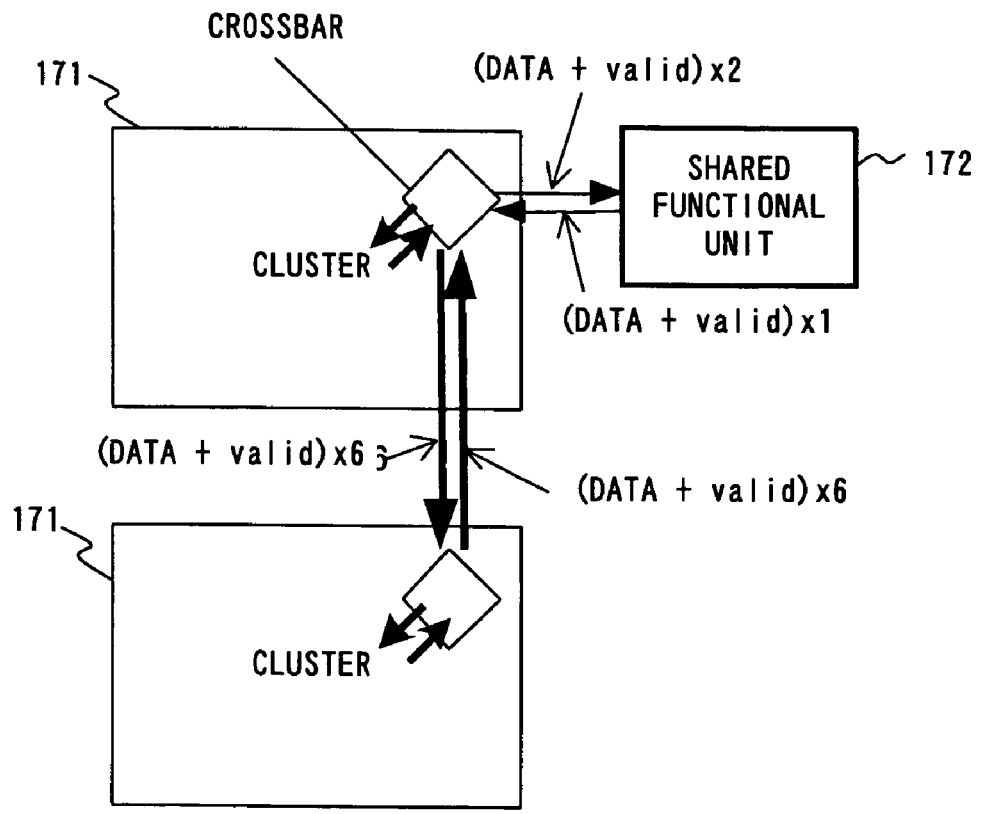
FIG. 20 exemplifies a direct connection to a crossbar switch of a cluster.

The next description is of a connection method for a shared functional unit with a cluster by referring to FIGS. 20 and 19. FIG. 20 exemplifies a direct connection of shared functional unit 172 to a crossbar switch of clusters 171 which are directly connected thereby.

The input of the shared functional unit 172 and the clusters 171 are directly connected with the input port of the multi-port input control unit. And the output of the shared functional unit 172 and the crossbars of the clusters 171 are directly connected to the output port of the multi-port output control unit. These connections are effective if there is no need to switch by configuration information.

Figure 22:
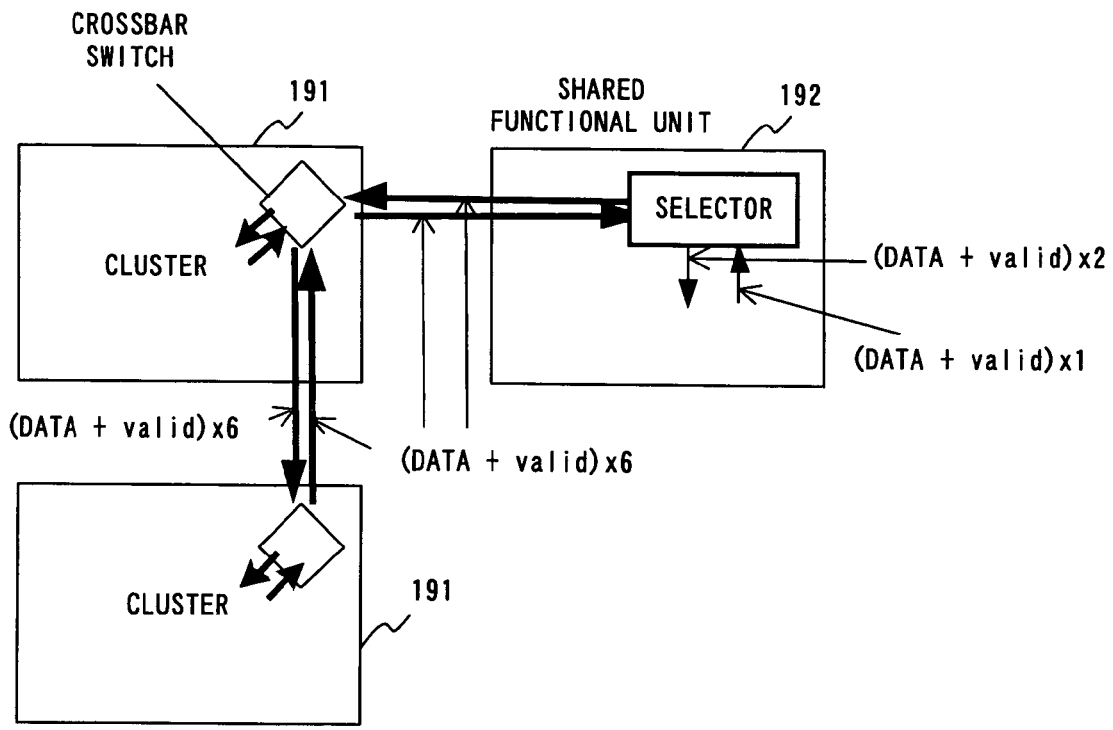
FIG. 22 exemplifies a comprisal of equipping a crossbar switch in a shared functional unit.

FIG. 22 exemplifies a comprisal of equipping a selector in a shared functional unit 192. A change of select or by configuration information makes it possible to select a connection method, thereby enabling clusters 181 to select a connection path for data and a valid signal dynamically.

Figure 21:
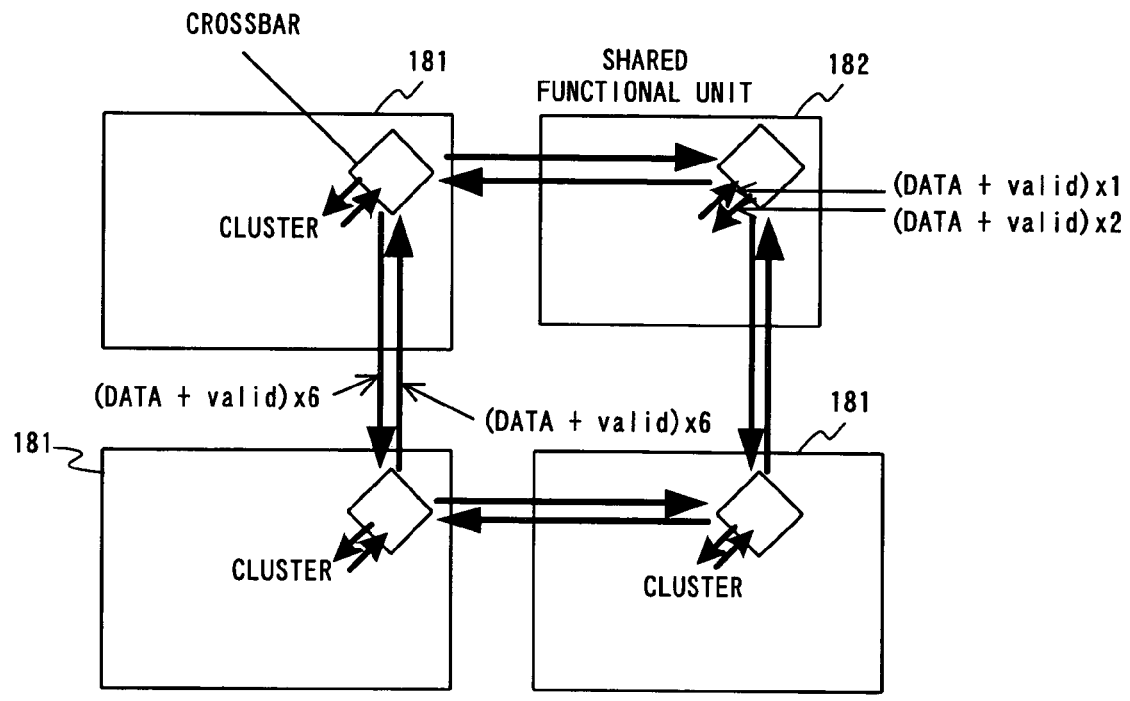
FIG. 21 exemplifies a comprisal of equipping a selector in a shared functional unit.

And, FIG. 21 exemplifies a comprisal of equipping a crossbar switch in a shared functional unit 182, enabling clusters 181 to select a connection path for data and a valid signal dynamically.

As such, selection and switching of a connection point required for data transmission enables a direct one to one connection between the data transmitter and receiver during the connection with each other, thereby reducing a possibility of crashing or crossing of data.

Last but not least, the above described embodiments in no way limit the present invention which can be improved and/or modified within the scope thereof.

What is claimed is:

1. A reconfigurable processing apparatus, comprising:
 a plurality of clusters, each cluster comprising an operation unit group with a plurality of operation units, a configuration memory, and a sequencer for controlling an instruction of each of the operation units and a connection of the operation unit group;
 at least one shared functional unit, each said at least one shared functional unit being provided independently from the clusters and being an application specific engine for carrying out a unique operation in order to improve operation efficiency, and including:
  an input unit having a plurality of input ports for accepting input data transmitted from the clusters and an input valid signal corresponding to the input data and indicating that each of the input data is valid,
  a functional unit for carrying out an operation processing based on the input data and the input valid signal, and for generating output data and an output valid signal as an operational result, and
  an output unit having a plurality of output ports for transmitting the output data and the output valid signal generated at the functional unit to the clusters; and
 an inter-cluster network for connecting the input ports and the output ports of the clusters and the shared functional units,
 wherein the at least one shared functional unit carries out the operation processing by utilizing a pipeline configuration, and the pipeline executes a fixed operation processing, wherein the functional unit includes an input data transform processing stage, an operation processing stage, and an output data transform processing stage, wherein when the functional unit is configured to functions as a divider, a two's complement processing is carried out in the input data transform processing stage, a division pipeline is carried out in the operation processing stage, and a two's complement processing is carried out in the output data transform processing stage, wherein when the functional unit functions as a sin and cos functional unit, a processing for transforming a value of input data into a value from 0 to n/2 is carried out in the input data transform processing stage, a sin/cos processing is performed in the operation processing stage, and a processing for returning to an original quadrant is carried out in the output data transform processing stage, wherein when the functional unit functions as an arctangent functional unit, a data rounding processing is carried out in the input data transform processing stage, an arctangent processing is carried out in the operation processing stage, and a n/4 transform processing is carried out in the output data transform processing stage, and wherein when the functional unit functions as a square root functional unit, a processing for determining an input divisor is carried out in the input data transform processing stage, a division processing is carried out in the operation processing stage, and a processing for determining a square root from a quotient and a divisor is carried out in the output data transform processing stage.

2. The reconfigurable processing apparatus according to claim 1, wherein said shared functional unit comprises an ID generation unit for generating an ID corresponding to the input port, and specifies by the ID the output port of said output unit which is to be an output destination of the output data and the output valid signal.

3. The reconfigurable processing apparatus according to claim 1 wherein said pipeline generates an internal valid signal as well as an ID which is an identifier signal, and transmits, by way of the pipeline, the ID as well as a processed data which is generated from said input data when receiving the input data and said input valid signal from a plurality of said clusters.

4. The reconfigurable processing apparatus according to claim 1, wherein a comprisal of said shared functional unit is equipped by a plurality of application specific engines, each of which carries out a unique operation.

5. The reconfigurable processing apparatus according to claim 4, wherein said shared functional unit generates an operation processing selection signal based on said input data and said input valid signal from each cluster, and switches said application specific engines comprised by the functional unit according to the operation processing selection signal.

6. The reconfigurable processing apparatus according to claim 5, wherein said operation processing selection signal is generated through selecting, and establishing, a table made up of operation processing codes corresponding to an application specific engine comprised by said functional unit, inputting the operation processing code which is said input data in order for each cluster to select the application specific engine, and selecting a signal corresponding to the input data for controlling a switch of the application specific engine.

7. The reconfigurable processing apparatus according to claim 1, wherein an input unit and output unit comprised by said shared functional unit are equipped with a selector which is reconfigurable based on a configuration data.

8. The reconfigurable processing apparatus according to claim 1, wherein an input unit and output unit comprised by said shared functional unit are equipped with a crossbar switch.

9. The reconfigurable processing apparatus according to claim 1, wherein said network comprises a selector switch for switching a connection between said clusters and said shared functional unit.

10. A reconfigurable processing apparatus, comprising:
a plurality of clusters, each composed of an operation unit group with a plurality of operation units, a configuration memory, and a sequencer for controlling an instruction of each of the operation units and a connection of the operation unit group;
a shared functional unit provided independently from the clusters and being an application specific engine for carrying out a unique operation in order to improve operation efficiency, the shared functional unit including:
an input unit having a single input port for accepting data transmitted from the clusters and an input valid signal indicating that each of the data is valid, and
an output unit having a single port for transmitting output data and an output valid signal to the clusters;
an inter-cluster network for connecting input/output ports of the clusters and the shared functional unit; and
a selector switch for switching a connection between the clusters and the shared functional unit,
wherein the shared functional unit carries out the operation processing by utilizing a pipeline configuration, and the pipeline executes a fixed operation processing,
wherein the functional unit includes an input data transform processing stage, an operation processing stage, and an output data transform processing stage,
wherein when the functional unit functions as a divider, a two's complement processing is carried out in the input data transform processing stage, a division pipeline is carried out in the operation processing stage, and a two's complement processing is carried out in the output data transform processing stage,
wherein when the functional unit functions as a sin and cos functional unit, a processing for transforming a value of input data into a value from 0 to n/2 is carried out in the input data transform processing stage, a sin/cos processing is performed in the operation processing stage, and a processing for returning to an original quadrant is carried out in the output data transform processing stage,
wherein when the functional unit functions as an arctangent functional unit, a data rounding processing is carried out in the input data transform processing stage, an arctangent processing is carried out in the operation processing stage, and a n/4 transform processing is carried out in the output data transform processing stage, and
wherein when the functional unit functions as a square root functional unit, a processing for determining an input divisor is carried out in the input data transform processing stage, a division processing is carried out in the operation processing stage, and a processing for determining a square root from a quotient and a divisor is carried out in the output data transform processing stage.

* * * * *